(12) United States Patent
Reichwein et al.

(10) Patent No.: US 6,311,162 B1
(45) Date of Patent: *Oct. 30, 2001

(54) INTERACTIVE SYMPTOMATIC RECORDING SYSTEM AND METHODS

(76) Inventors: Ernst F. Reichwein, 6860 S. Bannock St.; Joseph G. White, 6493 S. Datura St., both of Littleton, CO (US) 80120

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/122,404

(22) Filed: Jul. 25, 1998

(51) Int. Cl.$^7$ .................................................. G06F 17/60
(52) U.S. Cl. .................................................. 705/1
(58) Field of Search ........................ 705/1, 8, 9; 701/29, 701/30, 31, 32, 35

(56) References Cited

U.S. PATENT DOCUMENTS

| | | | |
|---|---|---|---|
| D. 370,478 | 6/1996 | Swift et al. ........................ D14/116 |
| 4,449,186 | 5/1984 | Kelly et al. ........................ 364/407 |
| 4,602,127 | 7/1986 | Neely et al. ........................ 360/53 |
| 4,916,441 | 4/1990 | Gombrich ........................ 340/712 |
| 4,975,847 | 12/1990 | Abe et al. ........................ 364/424.03 |
| 5,056,023 | 10/1991 | Abe ........................ 364/424.03 |
| 5,058,044 | 10/1991 | Stewart et al. ........................ 346/551.01 |
| 5,107,428 | 4/1992 | Bethencourt et al. ........................ 364/424.04 |
| 5,128,862 | * 7/1992 | Mueller ........................ 705/15 |
| 5,132,905 | 7/1992 | Takai et al. ........................ 364/424.03 |
| 5,214,582 | 5/1993 | Gray ........................ 364/551.01 |
| 5,404,443 | 4/1995 | Hirata ........................ 395/161 |
| 5,488,575 | 1/1996 | Danielson et al. ........................ 364/707 |
| 5,499,707 | 3/1996 | Steury ........................ 194/217 |
| 5,513,107 | 4/1996 | Gormley ........................ 364/424.05 |
| 5,533,093 | 7/1996 | Horton et al. ........................ 379/21 |
| 5,537,315 | 7/1996 | Mitchum ........................ 364/408 |
| 5,539,429 | 7/1996 | Yano et al. ........................ 345/173 |
| 5,541,840 | 7/1996 | Gurne et al. ........................ 364/424.03 |
| 5,557,268 | 9/1996 | Hughes et al. ........................ 340/933 |
| 5,557,515 | * 9/1996 | Abbruzzese et al. ........................ 705/9 |
| 5,586,037 | 12/1996 | Gil et al. ........................ 364/464.03 |
| 5,592,378 | * 1/1997 | Cameron et al. ........................ 705/27 |
| 5,644,619 | * 7/1997 | Farris et al. ........................ 379/27 |
| 5,687,212 | * 11/1997 | Kinser, Jr. et al. ........................ 379/10 |
| 5,737,728 | * 4/1998 | Sisley et al. ........................ 705/8 |
| 5,790,119 | * 8/1998 | Sklut et al. ........................ 345/349 |
| 5,826,239 | * 10/1998 | Du et al. ........................ 705/8 |

(List continued on next page.)

FOREIGN PATENT DOCUMENTS 0 248 137 * 4/1986 (EP) .
0 748 080 * 12/1996 (EP) .
0 333 620 * 9/1998 (EP) .

OTHER PUBLICATIONS

"Connecting with Customers;" Business Line; Jul. 16, 1998.*

"Computer guide: systems, hardware, software;" Chilton's Distribution; vol. 82, p. 74(3); Mar. 1983.*

(List continued on next page.)

*Primary Examiner*—V. Millin
*Assistant Examiner*—Forest O Thompson
(74) *Attorney, Agent, or Firm*—Holland & Hart LLP

(57) ABSTRACT

An interactive computerized system and process for querying a customer regarding identification for both customer and equipment, such as an automobile, information, as well as problems related to such equipment and desired repairs and maintenance for the equipment, then compiling and processing the acquired information and thereafter preparing and printing work orders for the customer, the service advisor and the mechanics.

39 Claims, 54 Drawing Sheets

U.S. PATENT DOCUMENTS

| | | | | |
|---|---|---|---|---|
| 5,852,819 | * | 12/1998 | Beller | 707/1 |
| 5,877,961 | * | 3/1999 | Moore | 364/474.22 |
| 5,924,074 | * | 7/1999 | Evans | 705/3 |
| 5,933,136 | * | 8/1999 | Brown | 705/2 |
| 5,937,388 | * | 8/1999 | Davis et al. | 705/8 |
| 5,974,388 | * | 10/1999 | Durham | 705/1 |
| 6,047,259 | * | 4/2000 | Campbell et al. | 705/3 |

OTHER PUBLICATIONS

"Voice of the industry;" Modern Casting; vol. 88, p. 32(1); Oct. 1998.*

Hale, Gregory; "Virtual Tug of War;" Computer Reseller news; n633, p. 35(8); Jun. 5, 1995.*

Armstrong, Michael W.; "Defense dirm Analytics going public; Willow Grove company seeks $5.9 million through IPO;" Philadelphia Business Journal; vol. 6, n43, p. 1(2); Jan. 11, 1988.*

M2 Preswire Oct. 21, 1996 M2 Communications.

* cited by examiner

CUSTOMER'S INFORMATION:

CUSTOMER INFORMATION:

JOHN DOE

[CHANGE]

1234 HIS WAY ST.

[CHANGE]

ANYTOWN, USA 12345

[CHANGE]

CUSTOMER VEHICLE

VEHICLE LICENSE #:
[CHANGE] BRT-1234 ▶

VEHICLE DESCRIPTION:
DODGE RAM 350, FORREST GREEN, 2001 ▶

[OK]  [BACK]

CUSTOMER'S INFORMATION:

CUSTOMER INFORMATION:

JOHN DOE

[CHANGE]

1234 HIS WAY ST

[CHANGE]

ANYTOWN, USA 12345

[CHANGE]

CITY, STATE, ZIP:

ANYTOWN, USA 12345   [<]

[1][2][3][4][5][6][7][8][9][0][-]
[Q][W][E][R][T][Y][U][I][O][P]
[A][S][D][F][G][H][J][K][L][.]
[Z][X][C][V][B][N][M][,][.]

[CLEAR]   [SPACE]   [DONE]

*Fig. 12C*

MAIN MENU

PLEASE INDICATE THE GENERAL AREA IN WHICH THE PROBLEM IS OCCURRING. IF YOUR VEHICLE REQUIRES ONLY MAINTENANCE SERVICE, AND THERE ARE NO PROBLEMS AT THE PRESENT TIME, PLEASE PRESS NUMBER EIGHT ON THE SERVICE MENU. IF YOUR PROBLEM OR REQUEST DOES NOT FALL WITHIN THE CATERGORIES LISTED, PRESS NUMBER EIGHT.

TOUCH THE AREA OR AREAS BELOW, THEN TOUCH DONE.

- ☐ 1. ENGINE / DRIVEABILITY
- ☐ 2. NOISES / VIBRATIONS
- ☐ 3. AUTOMATIC / MANUAL / 4 WHEEL DRIVE TRANSMISSION
- ☐ 4. HEATER / AIR CONDITIONING
- ☐ 5. BRAKES
- ☐ 6. STEERING / SUSPENSION
- ☐ 7. POWER ACCESSORIES / ELECTRICAL
- ☐ 8. OTHER SERVICES

[DONE]   [HELP]

*Fig. 13*

ENTER CONTACT PHONE NUMBERS:

WELCOME TO THE JACK'S BMW. THIS SERVICE EXPRESS WRITER IS DESIGNED TO LESSEN YOUR TIME WAITING FOR SERVICE. AT THE SAME TIME IT INCREASES THE ACCURACY OF THE DESCRIPTION OF YOUR PROBLEM GIVEN TO THE TECHNICIAN WHO WILL WORK ON YOUR VEHICLE. WE HOPE YOU ENJOY THE EXPERIENCE.

PLEASE ENTER THE PHONE NUMBER(S) WHERE YOU CAN BE REACHED AT TODAY

PHONE NUMBERS:

[CHANGE]   (303)333-4444
[CHANGE]   (303)333-4444

[DONE]   [BACK]   [HELP]

*Fig. 12G*

ENGINE / DRIVEABILITY SECTION

THE FOLLOWING QUESTIONS ARE DESIGNED TO DELIVER VALUABLE INFORMATION TO THE SERVICE TECHNICIAN WHO WILL WORK ON YOUR VEHICLE. PLEASE TOUCH THE APPROPRIATE NUMBER FOR YOUR VEHICLE'S SYMPTOM. PLEASE ONLY USE THE PEN PROVIDED TO YOU.

1. SYMPTOMS WHEN STARTING
2. SYMPTOMS WHEN DRIVING
3. OTHER SYMPTOMS

[1] [2] [3]   [BACK] [HELP]

*Fig. 14A*

SYMPTOMS WHEN STARTING:

TOUCH THE APPROPRIATE SYMPTOM OR SYMPTOMS BELOW.

☐ DOES NOT TURN OVER
☐ TURNS OVER, BUT DOES NOT START.
☐ TURNS OVER SLOWLY.
☐ TURNS OVER PROPERLY, BUT STARTS HARD.
☐ TAKES TOO LONG BEFORE IT STARTS.
☐ I MUST PRESS THE GAS PEDAL HARD TO MAKE THE ENGINE START.
☐ STARTS OK, BUT THAN STALLS.
☐ NONE OF THE ABOVE STARTING SYMPTOMS.

[OK]   [BACK] [HELP]

*Fig. 14B*

SYMPTOMS WHEN DRIVING:

TOUCH THE APPROPRIATE SYMPTOM OR SYMPTOMS BELOW.

☐ HESITATES OR STALLS WHEN SPEEDING UP.
☐ STALLS WHEN I SLOW DOWN OR STOP.
☐ STALLS WHEN TURNING RIGHT OR LEFT.
☐ LACKS POWER AT HIGHWAY SPEED.
☐ LACKS POWER BELOW HIGHWAY (CITY) SPEEDS.
☐ ENGINE BACKFIRES (LOUD POPPING NOISE)
☐ ENGINE KEEPS RUNNING WHEN IGNITION KEY IS OFF.
☐ SPEEDS UP OR SLOWS DOWN UNEXPECTEDLY.
☐ ┆POOR FUEL ECONOMY.┆
☐ NONE OF THE ABOVE DRIVING SYMPTOMS.

[OK]   [BACK]   [HELP]

WHEN DO YOU NOTICE IT:

WHEN DO YOU NOTICE THE SYMPTOMS? TOUCH THE APPROPRIATE BOX OR BOXES.

○ COLD   ● NORMAL   ○ HOT   ○ ANY TEMP

WHEN THE ENGINE TEMPERATURE SHOWS:
○ BELOW 1000   ○ 1000 TO 2000   ○ 2000 TO 4000
○ OVER 4000 RPM   ● NOT APPLICABLE

WHEN THE ENGINE'S RPM SHOWS:
○ WARMING UP         ○ STARTING COLD
○ RESTARTING HOT    ● NOT APPLICABLE

WHEN THE VEHICLE IS:

DOES THE "CHECK ENGINE" LIGHT COME ON:
○ YES   ● NO

THE SYMPTOMS OCCURE WHEN MY VEHICLE'S
SPEED IS (MPH)
○ 0 TO 20   ○ 20 TO 35   ○ 35 TO 55
○ OVER 55 MPH   ● DOESN'T MATTER

THE SYMPTOM OCCURES WHEN I DRIVE FOR:
○ UNDER 5 MILES   ○ 5 TO 10 MILES
○ OVER 10 MILES   ● ┆DOESN'T MATTER┆

[OK]   [BACK]   [HELP]

*Fig. 14C*

NOISE INFORMATION:

LISTED BELOW ARE EXAMPLES OF NOISES COMMONLY FOUND COMING FROM YOUR VEHICLE. TOUCH THE APPROPRIATE BOX OR BOXES THAT BEST DESCRIBES THE NOISES YOU ARE HEARING.

☐ SQUEAK      ☐ TAP
☐ RATTLE      ☐ CLICK
☐ WHISTLE     ☐ GRIND
☐ HUM         ☐ GROWL
☐ BUZZ        ☐ KNOCK
☐ CHIRP       ☐ METAL CLANG
☐ SQUEAL      ☐ RUMBLE
☐ CLUNK       ☐ NONE OF THE ABOVE

[OK]   [BACK]   [HELP]

NOISE OR VIBRATION SELECTION:

THE FOLLOWING QUESTIONS ARE DESIGNED TO DELIVER VALUABLE INFORMATION TO THE SERVICE TECHNICIAN WHO WILL WORK ON YOUR VEHICLE. PLEASE TOUCH THE APPROPRIATE NUMBER FOR YOUR VEHICLE'S SYMPTOM.

1. NOISES-WHAT YOU CAN HEAR.
2. VIBRATIONS-WHAT YOU CAN FEEL.
3. BOTH NOISES AND VIBRATIONS.

[1] [2] [3]      [BACK]   [HELP]

*Fig. 15A*

TRANSMISSION INFORMATION:

THE FOLLOWING QUESTIONS ARE DESIGNED TO DELIVER VALUABLE INFORMATION TO THE SERVICE TECHNICIAN WHO WILL WORK ON YOUR VEHICLE. PLEASE TOUCH THE APPROPRIATE NUMBER FOR YOUR VEHICLE'S SYMPTOM. PLEASE ONLY USE THE PEN PROVIDED TO YOU.

1. AUTOMATIC TRANSMISSION
2. MANUAL TRANSMISSION
3. FOUR WHEEL DRIVE

[1] [2] [3]     [BACK] [HELP]

*Fig. 16A*

VIBRATION INFORMATION:

LISTED BELOW ARE EXAMPLES OF VIBRATIONS COMMONLY FOUND COMING FROM YOUR VEHICLE. TOUCH THE APPROPRIATE BOX OR BOXES THAT BEST DESCRIBES THE VIBRATIONS YOU ARE FEELING.

☐ SHAKING        ☐ SHUDDER
☐ THUMPING       ☐ PULSATION
☐ TREMBLING      ☐ MOAN
☐ BOOM           ☐ ROUGHNESS
☐ BUZZING        ☐ TINGLING
☐ CLUNK          ☐ RUMBLE
☐ CHATTER        ☐ SHIMMY
                 ☐ NONE OF THE ABOVE

[OK]     [BACK] [HELP]

*Fig. 15E*

AUTOMATIC TRANSMISSION:

TOUCH THE APPROPRIATE BOX OR BOXES THAT DESCRIBES THE SYMPTOM.

- ☐ DOESN'T SHIFT UP.
- ☐ DOESN'T SHIFT DOWN.
- ☐ DELAYS ENGAGEMENT IN FORWARD GEAR.
- ☐ DELAYS INGAGEMENT IN REVERSE GEAR.
- ☐ SHIFT IS ROUGH OR HARSH.
- ☐ SHIFT IS SLOW-SEEMS TO SLIP.
- ☐ SHIFT IS TOO EARLY.
- ☐ ENGINE RACES OR INCREASES RPM WHEN SHIFTING.
- ☐ TRANSMISSION MAKES UNUASAL NOISES.
- ☐ OIL OR FLUID LEAK COMING FROM TRANSMISSION.
- ☐ NONE OF THE ABOVE SYMPTOMS.

[OK]  [BACK]  [HELP]

MANUAL TRANSMISSION:

TOUCH THE APPROPRIATE BOX OR BOXES THAT DESCRIBES THE SYMPYOM.

- ☐ DOESN'T GO INTO ANY GEAR
- ☐ CLUTCH SEEMS TO SLIP GOING INTO GEAR.
- ☐ CHATTERS GOING INTO GEAR.
- ☐ MAKES A GRINDING NOISE GOING INTO GEAR
- ☐ CLUTCH SEEMS HARD TO DEPRESS.
- ☐ CLUTCH SEEMS SOFT TO DEPRESS.
- ☐ CLUTCH PEDAL ENGAGES TO HIGH.
- ☐ CLUTCH PEDAL ENGAGES TOO LOW.
- ☐ POPS OUT OF GEAR.
- ☐ OIL OR FLUID LEAKING FROR TRANSMISSION.
- ☐ NONE OF THE ABOVE SYMPTOMS.

[OK]  [BACK]  [HELP]

WHEN DOES IT HAPPEN:

WHEN DO YOU NOTICE THE SYMPTOM(S).
TOUCH THE APPROPRIATE BOX OR BOXES BELOW.

IN WHAT GEAR DOES THE SYMPTOM SHOW:

AUTOMATIC TRANSMISSION:
○ PARK   ○ REVERSE   ○ NEUTRAL
○ OD   ○ D   ○ 2   ○ 1   ● ANY GEAR.

MANUAL TRANSMISSION:
○ 1   ○ 2   ○ 3   ○ 4   ○ 5   ○ 6
○ NEUTRAL   ● ANY GEAR

THE SYSTEM SHOWS WHEN THE VEHICLE IS:
● ACCELERATING   ○ STANDING STILL   ○ BRAKING
○ TURNING   ○ SLOWING DOWN   ○ DRIVING UPHILL

THE SYMPTOM OCCURS WHEN I DRIVE FOR:
○ UNDER 5 MILES   ○ 5 TO 10 MILES
● OVER 10 MILES

MY VEHICLE'S ENGINE TEMPERATURE READS:
○ COLD   ● NORMAL   ○ HOT

[OK]   [BACK]   [HELP]

Fig. 16D

FOUR WHEEL DRIVE:
TOUCH THE APPROPRIATE BOX OR BOXES THAT DESCRIBES THE SYMPTOM.

DOESN'T SHIFT INTO 4WD HI.

DOESN'T SHIFT INTO 4WD LOW.

MAKES A GRINDING NOISE GOING INTO 4WD.

4WD LIGHT DOESN'T COME ON.

4WD FRONT HUBS DON'T ENGAGE.

HARD TO TAKE OUT OF 4WD.

NONE OF THE ABOVE SYMPTOMS.

[OK]   [BACK]   [HELP]

HEATER / AIR CONDITIONING:

THE FOLLOWING QUESTIONS ARE DESIGNED TO DELIVER VALUABLE INFORMATION TO THE SERVICE TECHNICIAN WHO WILL WORK ON YOUR VEHICLE. PLEASE TOUCH THE APPROPRIATE NUMBER FOR YOUR VEHICLE'S SYMPTOM. PLEASE ONLY USE THE PEN PROVIDED TO YOU.

1. HEATING SYSTEM.
2. AIR CONDITIONING SYSTEM.
3. AUTO TEMPERATURE CONTROL SYSTEM.

[1] [2] [3]    [BACK]    [HELP]

HEATING SYSTEMS:

TOUCH THE APPROPRIATE BOX OR BOXES THAT DESCRIBES THE SYMPTOM.

☐ TEMPERATURE CONTROL SELECTOR IS HARD TO MOVE.
☐ VENT CONTROL SELECTOR IS HARD TO MOVE.
☐ DOESN'T DELIVER HOT AIR.
☐ TAKES TOO LONG TO DELIVER HOT AIR.
☐ DEFROST INOPERABLE OR FOGS UP.
☐ ENGINE TRMPERATURE GUAGE DOESN'T MOVE OFF OF COLD.
☐ UNUSUAL ODORS WHEN OPERATING.
☐ AIR DOESN'T FLOW FROM ALL OUTLETS PROPERLY.
☐ NONE OF THE ABOVE SYMPTOMS.

[OK]    [BACK]    [HELP]

*Fig. 17B*

AUTOMATIC TEMPERATURE CONTROL SYSTEM:

TOUCH THE APPROPRIATE BOX OR BOXES THAT DESCRIBES THE SYMPTOM.

☐ TEMPERATURE READING IS INACCURATE.
☐ BUTTONS ON THE CONTROL UNIT ARE INOPERABLE.
☐ TAKES TOO LONG TO DELIVER ACCURATE TEMPERATURE.
☐ NONE OF THE ABOVE SYMPTOMS.

[OK]  [BACK]  [HELP]

*Fig. 17D*

AIR CONDITIONING SYSTEMS:

TOUCH THE APPROPRIATE BOX OR BOXES THAT DESCRIBES THE SYMPTOM.

☐ TEMPERATURE CONTROL SELECTOR IS HARD TO MOVE.
☐ VENT CONTROL SELECTOR IS HARD TO MOVE.
☐ DOESN'T DELIVER COLD AIR.
☐ TAKES TOO LONG TO DELIVER COLD AIR.
☐ TEMPERATURE CHANGES UNEXPECTEDLY.
☐ UNUSUAL ODORS WHEN OPERATING.
☐ DOESN'T FLOW FROM ALL OUTLETS PROPERLY.
☐ A/C COMPRESSOR SEEMS TO CYCLE TOO OFTEN.
☐ NONE OF THE ABOVE SYMPTOMS.

[OK]  [BACK]  [HELP]

*Fig. 17C*

WHED DOES IT HAPPEN:

WHEN DO YOU NOTICE THE SYMPTOM(S).
TOUCH THE APPROPRIATE BOX OR BOXES BELOW.

WHEN THE SELECTOR CONTROL IS:
○ FLOOR   ○ MIX   ○ VENT   ○ DEFROST
◉ DOESN'T MATTER

WHEN THE TEMPERATURE CONTROL IS:
○ COOL   ○ WARM   ○ NORMAL A/C   ○ MAX A/C
○ DEFROST   ◉ DOESN'T MATTER

WHEN I AM MOVING THE SELECTOR OR
CHANGING THE TEMPERATURE:
○ YES   ◉ NO

WHEN THE VEHICLE IS:
○ STOPPED   ○ ACCELERATING FROM STOP
○ MOVING   ○ DECELERATING   ◉ DOESN'T MATTER

WHEN THE VEHICLE TEMPETATURE IS:
○ COLD   ○ NORMAL   ○ HOT   ◉ DOESN'T MATTER

[OK]   [BACK]   [HELP]

*Fig. 17E*

BRAKE SYSTEM: THE FOLLOWING QUESTIONS ARE DESIGNED TO DELIVER VALUABLE INFORMATION TO THE SERVICE TECHNICIAN WHO WILL WORK ON YOUR VEHICLE. PLEASE TOUCH THE APPROPRIATE NUMBER FOR YOUR VEHICLE'S SYMPTOMS.

1. CONVENTIONAL BRAKE SYSTEM.
2. ANTI LOCK BRAKE SYSTEM.
3. BOTH SYSTEMS.

[1] [2] [3]     [BACK]     [HELP]

*Fig. 18A*

CONVENTIAL BRAKE SYSTEM TOUCH THE APPROPRIATE BOX OR BOXES THAT BEST DESCRIBES WHAT YOU ARE NOTICING.

☐ BRAKE PEDAL SEEMS TO PULSATE.
☐ PULLS RIGHT OR LEFT WHEN STOPPING.
☐ GRINDING NOISE WHEN STOPPING.
☐ SQUEAKS WHEN STOPPING.
☐ BRAKE PEDAL FADES (GOES TO THE FLOOR)
☐ BRAKE PEDAL SEEMS LOW.
☐ BRAKING EFFORT SEEMS EXCESSIVE.
☐ BRAKE LIGHT ON.
☐ NONE OF THE ABOVE SYMPTOMS.

[OK]     [BACK]     [HELP]

*Fig. 18B*

ANTI-LOCK BRAKING SYSTEM:
TOUCH THE APPROPRIATE BOX OR BOXES THAT DESCRIBES WHAT YOU ARE NOTICING.

☐ ANTI-LOCK BRAKES SEEM INOPERABLE.

☐ ANTI-LOCK BRAKE LIGHT IS ON CONSTANTLY.

☐ ANTI-LOCK BRAKE LIGHT IS ON INTERMITTENLY.

☐ NONE OF THE ABOVE.

[OK]   [BACK]   [HELP]

*Fig. 18C*

WHEN DOES IT HAPPEN:
WHEN DO YOU NOTICE THE SYMPTOM(S). PLEASE ANSWER THE QUESTIONS BY TOUCHING THE APPROPRIATE BOX OR BOXES WITH THE PROVIDED PEN.

WHEN I BRAKE UNDER THE FOLLOWING CONDITIONS:
⦿ NORMAL BRAKING ON DRY PAVED ROADS.

○ PANIC STOP (BRAKING HARD) ON DRY PAVED ROADES.

○ AT HIGH SPEEDS (ABOVE 55 MPH).

○ AT LOW SPEEDS.

WHEN MY VEHICLE'S ENGINE TEMPERATURE READS:
○ COLD  ⦿ NORMAL  ○ HOT

[OK]   [BACK]   [HELP]

*Fig. 18D*

STEERING INFORMATION:

TOUCH THE APPROPRIATE BOX OR BOXES THAT DESCRIBES THE SYMPTOM.

☐ STEERING WHEEL SHAKES WHILE DRIVING.
☐ VEHICLE PULLS RIGHT WHILE DRIVING.
☐ VEHICLE PULLS LEFT WHILE DRIVING.
☐ VEHICLE WANDERS LEFT OR RIGHT WHILE DRIVING.
☐ STEERING WHEEL IS OFF-CENTER.
☐ TIRES ARE WEARING ABNORMALLY.
☐ STEERING WHEEL SEEMS HARD TO TURN.
☐ POWER STEERING MAKES ABNORMAL NOISES.
☐ NONE IF THE ABOVE SYMPTOMS.

| OK | BACK | HELP |

*Fig. 19B*

STEERING AND SUSPENSION:

THE FOLLOWING QUESTIONS ARE DESIGNED TO DELIVER VALUABLE INFORMATION TO THE SERVICE TECHNICIAN WHO WILL WORK ON YOUR VEHICLE. PLEASE TOUCH THE APPROPRIATE NUMBER FOR YOUR VEHICLE'S SYMPTOM. PLEASE ONLY USE THE PEN PROVIDED TO YOU.

1. STEERING
2. SUSPENSION

| 1 | 2 | BACK | HELP |

*Fig. 19A*

WHEN DOES IT HAPPEN:

WHEN DO YOU NOTICE THE SYMPTOM(S).
TOUCH THE APPROPRIATE BOX OR BOXES BELOW.

WHEN THE VEHICLE IS:
○ ACCELERATING  ○ SLOWING DOWN OR STOPPING
○ TURNING  ○ TURNING ON PAVED ROADS
○ TURNING ON DIRT OR ROUGH ROADS
● DOESN'T MATTER

WHEN THE VEHICLES SPEED IS:
○ NOT MOVING  ○ 0 TO 10 MPH
○ 10 TO 35 MPH  ○ 35 TO 50 MPH
○ OVER 55 MPH

[OK]  [BACK]  [HELP]

SUSPENSION INFORMATION:

TOUCH THE APPROPRIATE BOX OR BOXES THAT DESCRIBES THE SYMPTOM.

☐ FRONT END BOUNCES EXCESSIVELY WHILE DRIVING.
☐ REAR END BOUNCES EXCESSIVELY WHILE DRIVING.
☐ RIGHT FRONT SEEMS TO SAG.
☐ LEFT FRONT SEEMS TO SAG.
☐ RIGHT REAR SEEMS TO SAG.
☐ LEFT REAR SEEMS TO SAG.
☐ SUSPENSION NOISE OVER BUMPS.
☐ SUSPENSION SEEMS TOO SOFT.
☐ AUTO RIDE CONTROL LIGHT COMES ON.
☐ NONE OF THE ABOVE SYMPTOMS.

[OK]  [BACK]  [HELP]

*Fig. 19C*

ELECTRICALLY OPERATED COMPONENTS:

TOUCH THE APPROPRIATE BOX OR BOXES THAT BEST DESCRIBE THE AREA OF THE SYMPTOM.

☐ EXTERIOR LIGHT(S).

☐ INTERIOR LIGHT(S)

☐ WARNING GUAGES OR LIGHTS.

☐ HORN OR CIGAR LIGHTER / POWER SOCKET.

☐ WINDSHIELD WIPERS / WASHERS.

☐ REAR WINDOW DEFROSTER.

IF THE ABOVE DOESN'T SEEM TO DESCRIBE THE PROBLEM, TOUCH "BACK" THEN SELECT "POWER ACCESSORIES" AND LOOK THERE FOR A BETTER DESCRIPTION.

[OK]  [BACK]  [HELP]

ELECTRICAL INFORMATION:

THE FOLLOWING QUESTIONS ARE DESIGNED TO DELIVER VALUABLE INFORMATION TO THE SERVICE TECHNICIAN WHO WILL WORK ON YOUR VEHICLE. PLEASE TOUCH THE APPROPRIATE NUMBER FOR YOUR VEHICLE'S SYMPTOM. PLEASE ONLY USE THE PEN PROVIDED TO YOU.

1. ELECTRICALLY OPERATED COMPONENTS.
1. POWER ACCESSORIES.

[1]  [2]  [BACK]  [HELP]

*Fig. 20A*

—LETS NARROW THE SEARCH:—

TOUCH THE APPROPRIATE BOX OR BOXES THAT DESCRIBES THE PROBLEM.

- ☐ SCRATCHED
- ☐ MISSING
- ☐ LEAKS AIR
- ☐ LEAKS WATER
- ☐ TORN
- ☐ BLEMISHED
- ☐ LIFT MECHANISM
- ☐ FOLD MECHANISM
- ☐ WON'T LOCK / UNLOCK

- ☐ OUT OF ADJUSTMENT
- ☐ BROKEN
- ☐ CRACKED
- ☐ WARPED
- ☐ LOOSE
- ☐ COLOR FADES
- ☐ PEELING
- ☐ PITTED
- ☐ DOESN'T WORK

☐ NONE OF THE ABOVE

[OK]  [BACK]  [HELP]

—POWER ACCESSORIES INFORMATION:—

TOUCH THE APPROPRIATE BOX OR BOXES THAT DESCRIBES THE SYMPTOM.

- ☐ KEYLESS ENTRY / ALARM SYSTEM.
- ☐ LIGHTED MIRRORS / POWER MIRRORS.
- ☐ AUTO DIM HEADLAMPS / INTERIOR LIGHTING.
- ☐ POWER SEAT ADJUSTMENT / COMFORT.
- ☐ AUDIO SYSTEMS / POWER ANTENNA.
- ☐ POWER WINDOWS / LOCKS / SUNROOF.
- ☐ CRUSE CONTROL.

IF THE ABOVE DOESN'T SEEM TO DESCRIBE THE PROBLEM, TOUCH "BACK" THEN SELECT "ELECTRICALLY OPERATED COMPONENTS" AND LOOK THERE FOR A BETTER DESCRIPTION.

[OK]  [BACK]  [HELP]

*Fig. 20C*

OTHER SERVICES AVAILABLE:

PLEASE SELECT THE CATEGORY OF THE PROBLEM YOU ARE OBSERVING WITH YOUR VEHICLE.

1. SCHEDULED MAINTENANCE.
2. UNSCHEDULED MAINTENANCE:
3. VEHICLE EXTERIOR.
4. VEHICLE INTERIOR.
5. SPECIAL ORDER PARTS/ RECALL NOTICE.
6. NEW OR USED CAR INTERNAL.
7. GENERAL PROBLEMS.

[1] [2] [3] [4] [5] [6] [7]

[BACK] [HELP]

*Fig. 21A*

SCHEDULED MAINTENANCE:

YOUR VEHICLE'S CLOSEST SCHEDULED MAINTENANCE SERVICE HAS BEEN HIGHLIGHTED BELOW. PLEASE CHOOSE THE SERVICE YOU WISH TO HAVE PERFORMED BY TOUCHING THE APPROPRIATE MILAGE. REFER TO YOUR MAINTENANCE SCHEDULE BOOKLET TO VIEW THE ITEMS PERFORMED IN THE SERVICE. IF YOU WISH TO CHANGE ANY PART OF THE SERVICE, SELECT HELP THEN #3

YOR ENTERED MILAGE IS: 12,500

● 12,000 MILES   ○ 18,000 MILES
○ 6,000 MILES    ○ 24,000 MILES

[OK]   [BACK]   [HELP]

*Fig. 21B*

VEHICLE EXTERIOR:

THIS SECTION INCLUDES THE VEHICLE'S BODY AND RELATED EXTERIOR PARTS. PLEASE TOUCH THE APPROPRIATE AREA IN WHICH THE PROBLEM IS OCCURRING.

○ BODY PANELS FIT AND FINISH.
○ EXTERIOR SEALS (DOORS, SUNROOF, TRUNK, ETC.)
○ PLASTIC TRIM AND MOLDINGS.
○ EXTERIOR MIRRORS, HANDLES, LOCKS AND BUTTONS.
○ WHEELS OR SPARE WHEEL CARRIERS.
○ PAINT AND / OR CLEARCOAT.
○ REMOVEABLE HARDTOP / SOFT TOP CONVERTABLE.
○ WINDSHIELD OR WINDOWS.
● EXTERIOR LIGHTS OR LIGHT COVERS.

[OK]   [BACK]   [HELP]

UNSCHEDULED MAINTENANCE:

TOUCH THE BOX OR BOXES NEXT TO THE APPROPRIATE SERVICES YOU WOULD LIKE PERFORMED. PLEASE REFER TO YOUR VEHICLE'S MAINTENANCE SCHEDULE BOOKLET FOR MORE INFORMATION OF THE SERVICES BELOW OR YOU CAN REQUEST A MAINTENANCE SHEET FROM ONE OF THE ASSISTANTS ON THE SERVICE AISLE.

☐ EVERY 3000 MILES:           $ 35.00
☐ EVERY 6000 MILES:           $ 55.00
☐ EVERY 15,000 MILES:         $ 85.00
☐ EVERY 30,000 MILES:         $100.00
☐ EVERY 60,000 MILES:         $125.00
☐ VEHICLE ALIGNMENT, 2 WHEEL: $ 35.00
☐ VEHICLE ALIGNMENT, 4 WHEEL: $ 75.00
☐ VEHICLE INSPECTION:         $ 35.00

[OK]   [BACK]   [HELP]

*Fig. 21C*

PROBLEM LOCATION:

TO HELP NARROW THE SEARCH, TOUCH THE WORD OR WORDS THAT BEST DESCRIBE WHERE THE PROBLEM IS LOCATED.

INTERIOR LOCATIONS:
- ● INTERIOR LIGHT.
- ○ INTERIOR INSTRUMENT LIGHT.

[ OK ]   [ BACK ]   [ HELP ]

*Fig. 21H*

VEHICLE INTERIOR:

THIS SECTION INCLUDES THE VEHICLE'S INTERIOR AND TRUNK AREA. PLEASE TOUCH THE APPROPRIATE NUMBER IN WHICH THE PROBLEM IS OCCURRING.

- ○ SEATS OR SEAT CUSHIONS.
- ○ CARPETING OR FLOOR MATS.
- ○ DOOR PANELS OR INTERIOR SIDE PANELS.
- ○ INTERIOR TRIM OR HEADLINER.
- ○ DASH PANEL OR INSTRUMENT PANEL.
- ○ INTERIOR KNOBS, HANDLES AND LATCHES.
- ○ INTERIOR SWITCHES, BUTTONS, LOCKS AND SLIDES.
- ○ WINDSHIELD OR WINDOWS.
- ● INTERIOR LIGHTING, INSTRUMERT PANEL LIGHTING.

[ OK ]   [ BACK ]   [ HELP ]

*Fig. 21G*

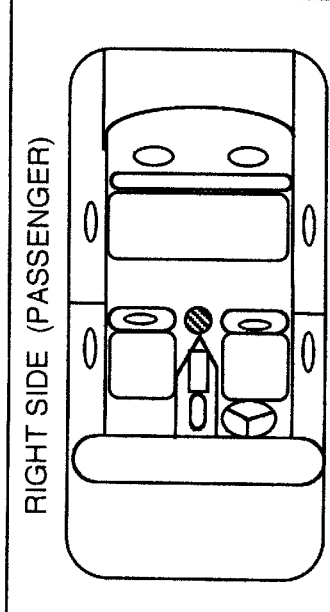

Fig. 21N

THINGS YOU SEE:

TOUCH THE BOX NEXT TO THE WORD OR PHRASE THAT BEST DESCRIBE THE PROBLEM.

- ☐ SCRATCHED
- ☐ MISSING
- ☐ LEAKS AIR
- ☐ LEAKS WATER
- ☐ TORN
- ☐ BLEMISHED
- ☐ LIFT MECHANISM
- ☐ FOLD MECHANISM
- ☐ WONT LOCK / UNLOCK

- ☐ OUT OF ADJUSTMENT
- ☐ BROKEN
- ☐ CRACKED
- ☐ WARPED
- ☐ LOOSE
- ☐ COLOR FADES
- ☐ PEELING
- ☐ PITTED
- ☐ DOESN'T WORK

☐ NONE OF THE ABOVE

[OK] [BACK] [HELP]

Fig. 21M

THIS SECTION OFFERS YOU A GENERAL DESCRIPTION OF THE VEHICLE'S PROBLEM AND PROVIDES THE TECHNICIAN WITH VITAL INFORMATION TO BEGIN A SUCCESSFUL REPAIR. IF YOU CAN'T FIND YOUR VEHICLE'S SYMPTOM IN THE MAIN MENU, PROCEED TO THE NEXT SCREEN BY TOUCHING OK BELOW, OR SEE YOUR SERVICE ADVISOR.

THERE ARE FOUR MAIN SENSES YOU HAVE THAT INDICATE A PROBLEM WITH YOUR VEHICLE. PLEASE CHOOSE THE MOST APPROPRIATE SENSE BELOW.

1. THINGS YOU SEE.
2. THINGS YOU HEAR.
3. THINGS YOU SMELL.
4. THINGS YOU FEEL.

[1] [2] [3] [4]   [BACK] [HELP]

THINGS YOU SMELL:

TOUCH THE BOX NEXT TO THE WORD OR PHRASE THAT BEST DESCRIBE THE PROBLEM.

☐ BURNING SMELL
☐ MUSTY ODOR
☐ RAW FUEL SMELL
☐ ROTTEN-EGG SMELL
☐ EXHAUST LEAK
☐ ENGINE COOLANT SMELL
☐ BURNING BRAKE SMELL
☐ BURNING CLUTCH SMELL
☐ BURNING RUBBER SMELL
☐ NONE OF THE ABOVE SYMPTOMS.

[OK]  [BACK]  [HELP]

*Fig. 21P*

THINGS YOU HEAR:

TOUCH THE BOX NEXT TO THE WORD OR PHRASE THAT BEST DESCRIBE THE PROBLEM.

☐ SQUEAK         ☐ TAP
☐ RATTLE         ☐ CLICK GRIND
☐ WHISTLE        ☐ GROWL
☐ HUM            ☐ KNOCK
☐ BUZZ           ☐ METAL CLANG
☐ CHIRP          ☐ RUMBLE
☐ SQUEAL         ☐ NONE OF
☐ CLUNK             THE ABOVE

[OK]  [BACK]  [HELP]

WHEN DOES IT HAPPEN:

WHEN DO YOU NOTICE THE SYMPTOMS ?
TOUCH THE APPROPRIATE BOX OR BOXES.

WHEN THE VEHICLE IS:
- ○ ACCELERATING
- ○ SLOWING DOWN OR STOPPING
- ○ TURNING ON PAVED ROADS
- ○ TURNING ON DIRT ROADS
- ● DOESN'T MATTER

WHEN THE VEHICLES SPEED IS:
- ● NOT MOVING
- ○ 0 TO 10 MPH
- ○ 10 TO 35 MPH
- ○ 35 TO 50 MPH
- ○ OVER 55 MPH

[OK]  [BACK]  [HELP]

Fig. 21Q

THINGS YOU FEEL:

LISTED BELOW ARE EXAMPLES OF VIBRATIONS COMMONLY FOUND COMING FROM YOUR VEHICLE. TOUCH THE APPROPRIATE BOX OR BOXES THAT BEST DESCRIBE THE VIBRATION(S) YOU ARE FEELING.

- ☐ SHAKING
- ☐ THUMPING
- ☐ TREMBLING
- ☐ BOOM
- ☐ BUZZING
- ☐ CLUNK
- ☐ CHATTER
- ☐ SHUDDER
- ☐ PULSATION
- ☐ MOAN
- ☐ ROUGHNESS
- ☐ TINGLING
- ☐ RUMBLE
- ☐ SHIMMY
- ☐ NONE OF THE ABOVE

[OK]  [BACK]  [HELP]

RETURN PROBLEM:
WHEN DO YOU NOTICE THE SYMPTOMS? TOUCH THE APPROPRIATE BOX OR BOXES.

HOW MANY TIMES HAS THE PROBLEM BEEN WORKED ON:
● ONCE  ○ TWICE  ○ THREE TIMES AND OVER

APPROXIMATELY HOW LONG AGO:
● A FEW DAYS AGO   ○ A WEEK TO TWO WEEKS
○ A FEW WEEKS       ○ MONTH AGO

HAS THE PROBLEM BEEN LOOKED AT BY ANYONE OTHER THAN THIS SERVICES DEPARTMENT:
○ YES  ● NO

[OK]   [BACK]   [HELP]

OTHER SYMPTOMS:
PLEASE TELL US ABOUT THE SYMPTOMS.

HOW OFTEN DOES THE SYMPTOM SHOW UP:
● ALWAYS  ○ SOMETIMES  ○ RARELY

WHEN DID THE PROBLEM BEGIN:
○ AFTER LAST REPAIR    ● JUST STARTED
○ A FEW DAYS AGO       ○ MORE THAN A WEEK
○ A FEW WEEKS          ○ MORE THAN A MONTH AGO

HAS THE PROBLEM BEEN WORKED ON BEFOFE:
○ YES  ● NO

WHEN THE PROBLEM OCCURES, THE WEATHER IS:
○ HOT   ○ HUMID OR RAINY  ○ COOL
○ FREEZING COLD  ● DOESN'T MATTER

[OK]   [BACK]   [HELP]

*Fig. 22B*

UNSCHEDULED SERVICES:

WOULD YOU LIKE ANY OF THE FOLLOWING
UNSCHEDULED SERVICES TO BE PERFORMED.

☐ COMPUTERIZED VEHICLE ALIGNMENT        $ 95.00
  (EXTENDS TIRE LIFE, IMPROVES HANDLING)

☐ LUBE, OIL AND FILTER CHANGE           $ 45.00
  (EXTENDES THE LIFE OF THE ENGINE
  AND SUSPENSION PARTS)

☐ MINOR TUNE-UP                         $ 50.00
  (IMPROVES FEUL MILAGE AND GIVES
  QUICKER STARTS)

☐ VEHICLE DETAIL AND WASH               $25.00
  (IMPROVES YOUR VEHICLES APPEARANCE)

[OK]   [BACK]   [HELP]

*Fig. 24*

ADDITIONAL PROBLEMS:

DO YOU HAVE ANY ADDITIONAL VEHICLE PROBLEMS
OR MAINTENANCE REQUIREMENTS YOU WOULD
LIKE TO HAVE ADDRESSED TODAY.

[ADD SYMPTOM]

[DONE]   [BACK]

VEHICLE ESTIMATE AND PICK-UP TIME:

YOUR PERSONAL SERVICE ADVISOR IS: _____. HE OR SHE WILL CONTACT YOU AND PROVIDE YOU WITH ANY ESTIMATED REPAIR COSTS AND PICK-UP TIME FOR YOUR VEHICLE. IF YOU PREFER AN APPROXIMATE COST AND PICK-UP TIME NOW, SEE YOUR SERVICE ADVISOR AFTER COMPLETING YOUR REPAIR ORDER. PLEASE CHOOSE YOUR OPTION BELOW.

● PLEASE CONTACT ME
○ I WOULD LIKE TO SEE THE ADVISOR.

[OK] [BACK] [HELP]

Fig. 26

ESTIMATED REPAIR COSTS:

THE ESTIMATED MAINTENANCE COST IS AS FOLLOWS:

TOTAL: $ 0.00

PLEASE KEEP IN MIND THE ACTUAL COSTS MAY BE HIGHER OR LOWER THAN THE ESTIMATE. WE WILL CONTACT YOU IF THE COST OF THE REPAIR IS HIGHER THAN THE ESTIMATE.

[OK] [BACK] [HELP]

WAIT/ DROP OFF / LOANER SCREEN:

PLEASE ANSWER THE FOLLOWING QUESTIONS
SO WE CAN PREPARE FOR YOU.

ARE YOU WAITING FOR YOUR VEHICLE:
○ YES  ⬤ NO

WOULD YOU LIKE A LOANER VEHICLE:
○ YES  ⬤ NO

WOULD YOU LIKE TO RECEIVE THE
REPLACED PARTS:
○ YES  ⬤ NO

[OK]  [BACK]  [HELP]

*Fig. 30*

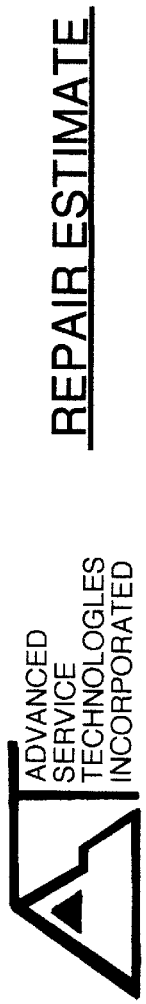

REPAIR ESTIMATE

ADVANCED SERVICE TECHNOLOGIES INCORPORATED

CONTROL NO. 553
DATE: 7/13/98
TIME: 7:54:15 PM

VEHICLE: DESCRIPTION: *DODGE RAM 350,FORREST GREEN,2001* MILEAGE:33225 VIN:123456789 PLATE: BRT-1234

CUSTOMER: NAME: *JOHN DOE* PHONE #1: (303)333-4444 PHONE #2: (303)333-4445
ADDRESS: *1234 HIS WAY ST.* CITY/ST/ZIP: ANYTOWN, USA 12345

ANTI-LOCK BRAKE SYSTEM
ANTI-LOCK BRAKE LIGHT IS ON CONSTANTLY.
ANTI-LOCK BRAKE LIGHT IS ON INTERMITTENTLY.
WHEN I BRAKE UNDER THE FOLLOWING CONDITIONS: NORMAL BRAKING ON DRY PAVED ROADS.
WHEN MY VEHICLE'S ENGINE TEMPERATURE READS: NORMAL
HOW OFTEN DOES THE SYMPTOM SHOW UP: ALWAYS
WHEN DID THE PROBLEM BEGIN: JUST STARTED
SHOW MANY TIMES HAS THE PROBLEM BEEN WORKED ON: THREE TIMES AND OVER
APPROXIMATELY HOW LONG AGO: A FEW DAYS AGO

ELECRTICALLY OPERATED COMPONENTS
INTERIOR LIGHT(S)
WARNING GUAGES OR LIGHTS.
HORN OR CIGAR LIGHTER / POWER SOCKET.
WHAT DID YOU NOTICE: CRACKED
WHAT DID YOU NOTICE: WARPED
WHAT DID YOU NOTICE: LOOSE
WHEN I START THE VEHICLE.
WHEN I TRY TO SET THE CONTROL.
WHEN I OPEN A DRIVER-SIDE DOOR.
WHEN I TURN THE HEAD LIGHTS ON.
SECTION C3 WAS CHOSEN FOR THE ELECTRICAL PROBLEM LOCATION.
HOW OFTEN DOES THE SYMPTOM SHOW UP: ALWAYS
WHEN DID THE PROBLEM BEGIN: JUST STARTED
HOW MANY TIMES HAS THE PROBLEM BEEN WORKED ON: THREE TIMES AND OVER
APPROXIMATELY HOW LONG AGO: A WEEK TO TWO WEEKS (CONTINUED ON FIG. 32B)

*Fig. 32A*

(CONTINUED FROM FIG. 32A)

STEERING SYSTEM

VEHICLE PULLS RIGHT WHILE DRIVING.
VEHICLE PULLS LEFT WHILE DRIVING
VEHICLE WANDERS LEFT OR RIGHT WHILE DRIVING.

TOTAL PARTS: _____ TOTAL LABOR: _____ MATERIALS COST _____ TAX _____ GRAND TOTAL _____

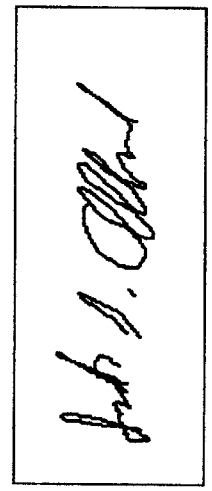

SIGNATURE:

AUTHORIZATION: I AUTHORIZE THE ABOVE WORK TO BE PREFORMED AND AGREE TO THE TERMS OF THIS REPAIR ORDER. FURTHERMORE, I RELEASE ANY AND ALL LIABILITY TO RPM ENTERPRISES, INC. ON THE ABOVE VEHICLE INCLUDING, BUT NOT LIMITED TO: DAMAGE, THEFT, FAILURE OF RELATED REPAIR ITEMS, AND EXPRESSED OR IMPLIED WARRENTY OF ALL INSTALLED PARTS.

*Fig. 32B*

INTERACTIVE SYMPTOMATIC RECORDING SYSTEM AND METHODS

FIELD OF INVENTION

The present invention relates generally to interactive computerized systems and methods for obtaining and processing information. More particularly, the present invention pertains to an interactive system and method for receiving information regarding a customer, the equipment, such as an automobile, a tractor and/or trailer, a fork lift, cherry picker or front loader, and the symptomatic problems that prompt the need for service or repairs, and the processing of this information to generate work and parts orders for the customer, the supplier(s), and service personal parts. The invention further pertains to the optional transmission of work completion data to accounting and/or quality control subsystems. While the invention is usable for servicing a variety of equipment, it will be primarily described here in terms of automobiles because the description of this example addresses most, if not all, of the problems relative to a large repair shop for such equipment.

BACKGROUND OF THE INVENTION

Dropping off equipment at a dealership or repair shop for service can be a time-consuming and frustrating activity. Even though such organizations may open as early as 7 a.m. and stay open until 6 p.m., or so to accept equipment for service, these hours are not always long enough to accommodate all customers. Consequently, some customers find it necessary to drop their equipment off during the hours the service centers are closed. With automobiles, for example, the driver usually leaves their keys in an envelope upon which they write the observed problems and request service. Appliances would be put into a cubicle, which locks on closure after the owner has filled out a problem description. In such instances, the complete situation is not always communicated effectively. Even when the repair shop is open, the customer may need to wait quite some time to provide the necessary information to a service manager or other representative, creating further delays. This process is improved using the modern computer technology of this invention.

The present invention provides an interactive, user-friendly symptomatic recording system for the driver or other equipment deliverer. The customer can answer basic Menu-driven queries and/or prompts and the system will prepare and transmit to the repair center a preliminary symptomatic report including the symptom or symptoms that prompted the need for repair as well as the frequency of occurrence. For example the problem could be hard starting in the cold that has never happened before. The system is particularly useful for employment outside the normal operating hours of the repair facility.

Representative of the art is;

U.S. Pat. No. 5,214,582, issued to Gray, teaches interactive diagnostic systems and methods for automotive vehicles of the type having networks of sensors and actuators for sensing and actuating various functions in the vehicle and onboard computers for monitoring sensors and controlling the actuators. An external computer is used to control selected actuators independent of the onboard computer and for simulating operation of selected sensors. At the same time, the electronic data entering and exiting the onboard computer is monitored and analyzed by the external computer for trouble shooting purposes.

U.S. Pat. No. 5,513,107, issued to Gormley of Ford Motor Co., teaches methods and apparatus for controlling operating subsystems of motor vehicles. Diagnostic and maintenance services for the vehicles are provided by monitoring various operating subsystems connected to a vehicle controller and recording diagnostic data. Such data can be periodically communicated to a service center which determines the service(s) needed and communicates there conclusions back to the vehicle controller where it is displayed to the vehicle operator.

U.S. Pat. No. 5,557,268, issued to Hughes et al. of Exxon, teaches an automatic vehicle recognition and customer automobile diagnostic system. Each vehicle includes a transponder that transmits an rf code so that vehicle diagnostic measurements made upon entry to the service facility can be associated with the specific vehicle and displayed to the customer in their service area.

U.S. Pat. No. 5,058,044, issued to Stewart et al., teaches a system for automatically identifying vehicles assimilating data from the identified vehicle, correlating the data with predetermined data and providing a statement of account for a transaction involving the vehicle. A service record for the vehicle is prepared by the system for use in connection with such transactions. Data for the service record is provided primarily by onboard sensors, but may be augmented by data submitted via an onboard keyboard.

U.S. Pat. No. 4,602,127, issued to Neely et al., teaches a vehicle diagnostic system comprising a portable communications control station and a remote data processing station. A portable communications controller is connected to a vehicle data terminal to obtain data from the vehicle's onboard computer.

U.S. Pat. Nos. 4,975,847 and 5,065,023, both issued to Abe et al., teach motor vehicle diagnosis systems.

U.S. Pat. No. 5,541,840, issued to Gurne et al. of Chrysler Corporation, teaches a hand-held automotive diagnostic service tool which can operate with a master station to monitor, display, and process vehicle data and diagnose fault conditions. Service manual pages can be displayed and parts ordered on-line.

U.S. Pat. No. 5,533,093 teaches an automated trouble-shooting mechanism incorporated into portable test and communications equipment for telephone lines. Work order manager software is employed.

U.S. Pat. No. 4,916,441 teaches a hand-held pocket terminal having a display screen and bar code reader for use in conjunction with patient medical care.

Various aspects of interactive CRT touch panel displays are taught by U.S. Pat. Nos. 4,449,186 (to Kelly et al.), 5,404,443 (to Hirata), 5,488,575 (to Danielson et al.), 5,499,707 (to Steury) 1 5,537,315 (to Mitcham) and 5,539,429 (to Yano et al.). Such touch panels have been found useful in facilitating communications in a variety of customer service contexts.

The Super Advisor System marketed by Automatic Data Processing, Inc., of Hoffman Estates, Illinois, USA, allows Service advisors to use a hand-held, wireless pen pad computer system to select or decline maintenance items displayed on the computer's screen and to describe vehicular problems via a series of checklists and multiple-choice questions. The system also provides customer appointment management, etc., using Microsoft Windows®.

One aspect of the present equipment service invention is to provide an efficient system and process for obtaining, recording and utilizing appropriate information about a vehicle and why it requires service from a customer.

Another aspect of the invention is to provide a system for obtaining such information without the need for the presence of a representative of the repair shop.

Yet another aspect of the invention is to provide a complete, concise, and readable repair/service order for the mechanic, parts suppliers, and customer.

These and other objectives are fulfilled by preprogrammed interactive computer systems for obtaining vehicle information, symptoms and requests from a customer, and developing work and parts orders. The system includes:

interactive input, display, computing and storage mechanisms for querying the customer, receiving inputs of information, and storing the provided information;

preprogrammed central computer processing unit(s) for ordering successive presentations of appropriate queries for the customer via the display means;

a compiler to summarize the inputs received and process the summary to generate a work and/or parts order; and at least one printer to print the work order for both the customer and mechanic, billing records, and reminders to the vehicle service and other personnel for future services.

Optionally, an input mechanism can be provided to transmit data upon completion of the work to an accounting module or subsystem to facilitate preparation of the bill and notification of the customer by the accounting department. Such data can also be transmitted to a quality control subsystem.

Further input and display mechanisms are provided for the mechanic, service representative, or lay person using the system to check and provide status information about the automobile's current service program. A data bank is provided to receive and maintain current status information on work assignments being performed for customers and cars. Interactive communication units are provided to originate and receive calls to and from customers regarding the status of the work assignments on their cars. Interactive communication units are also provided to initiate and execute orders for service, supplies, and parts from dealer stock or external providers.

Other components of the system include interactive computer monitor screens which identify relevant portions of the vehicle, the locations therein, and symptoms. Input mechanisms for the system include touch-activating monitor screens and keyboards. A database of scheduled and unscheduled periodic maintenance tasks for various types of vehicles serviced can be linked to the pertinent query screens. This database information can be provided at a distance by use of the Internet or locally through computer memory. Programmed query sets include the categories of engine/drivability, noise/vibrations, transmission, 2 and 4-wheel or more drive, heater/AC, brakes, steering/suspension, power accessories/electrical, and miscellaneous other services.

Further, an interactive computerized process is provided for receiving customer inputs for, compiling and summarizing those inputs, and developing work orders for service personal and non-lay person technicians identifying the symptomatic problems that prompted the lay person to seek automobile repair and maintenance.

This is accomplished by steps including!

querying the customer and receiving inputs regarding the customer and automobile ID via computer input and output systems using Programmed sets of questions regarding specified vehicle systems and categories regarding the maintenance and/or repairs;

selecting the services which are requested and/or needed, including investigative work;

printing, storing and displaying work orders including the provided customer and vehicle ID and assigned services for both the customer and the assigned mechanics; and printing reminders for use by the equipment owner or equipment service personnel relative to prior history, dates or usage mileposts requiring further service or bar-coded information for future reference.

BRIEF DESCRIPTION OF THE DRAWINGS

Like reference characters designate corresponding parts in the several views.

FIG. 4 is a flow sheet for the category 1, "Engine Drivability", problems.

FIG. 5 is a flow sheet for the category 2, "Noises/Vibrations", problems.

FIG. 6 is a typical flow sheet for the category 3, "Automatic/Manual/4 Wheel Drive", problems.

FIG. 7 is a flow sheet for category 4, "Heating/AC", problems.

FIG. 8 is a flow sheet for category 5, "Brakes", problems.

FIG. 9 is a flow sheet for category 6, "Steering/suspension", problems.

FIG. 10 is a flow sheet for category 7, "Power Accessories/Electrical", problems.

FIG. 11 is a flow sheet for the category 8, "Other Services".

FIGS. 12–21R are illustrative of computer screens useful for obtaining the information needed under categories 1–8.

FIG. 12A to 12G illustrate selected computer monitor screens for "Introductory Information."

FIG. 13 illustrates a computer monitor screen for the selection of pertinent categories.

FIGS. 14A to 14D illustrate computer monitor screens for the "subcategory 1" program.

FIGS. 15A to 15E illustrate computer monitor screens for the "subcategory 2" program.

FIGS. 16A to 16E illustrate selected computer monitor screens for the "subcategory 3" program.

FIGS. 17A to 17E illustrate selected computer monitor screens for the "subcategory 4" program.

FIGS. 18A to 18D illustrate selected computer monitor screens for the "subcategory 5" program.

FIGS. 19A to 19D illustrate selected computer monitor screens for the "subcategory 6" program.

FIGS. 20A to 20F illustrate selected computer monitor screens for the "subcategory 7" program.

FIGS. 21A to 21S illustrate selected computer screens for the "subcategory 8" program.

FIGS. 22A to 22C illustrate selected computer screens for the "Additional Services" program.

FIG. 23 illustrates a computer screen for addressing "Additional Problems."

FIG. 24 illustrates a screen for "Unscheduled Services."

FIGS. 25A–26B illustrates screens asking for a review the "Repair Order."

FIG. 26 illustrates an "Estimated Repair Costs" screen.

FIG. 27 illustrates a "Designation of the Service Advisor and Cost Estimate" screen.

FIG. 28 illustrates a screen authorizing the repair work and acknowledges the criteria under which the repair is to be done.

FIG. 29 is illustrative of a screen providing instructions for the deposition of keys into a lockbox.

FIG. 30 illustrates a screen allowing a designation of whether the customer wishes to "Wait, Drop off the Car, or obtain a Loaner."

FIG. 32 depicts the representative print-out of "Repair Order."

DESCRIPTION OF THE PREFERRED EMBODIMENTS

Figure 1:
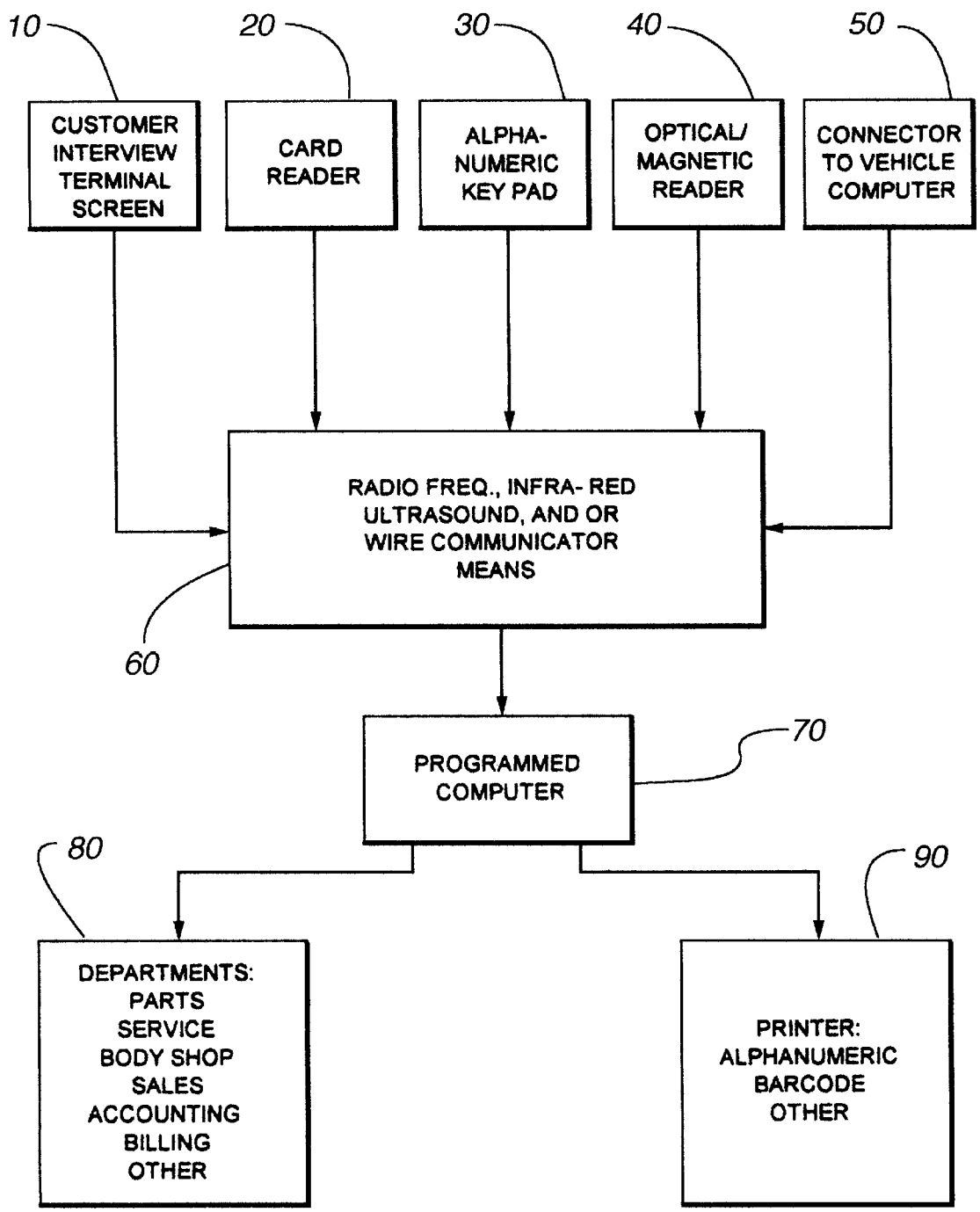
FIG. 1 provides a block diagram of the system, as it would be used at a typical automobile dealership or repair shop.
Figure 2A:
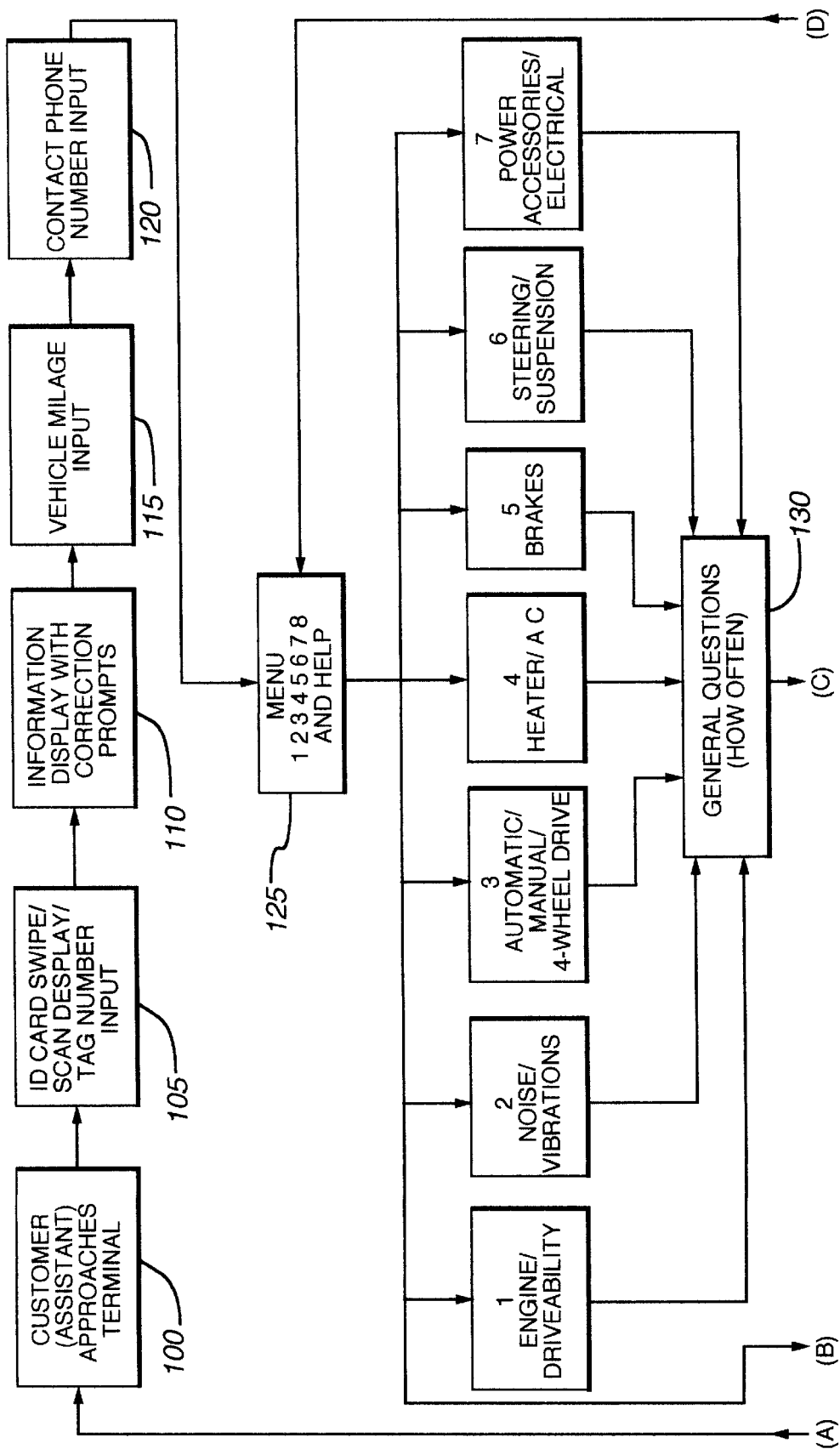
FIG. 2 is a master flow sheet illustrating the organization and operation of the system.
Figure 2B:
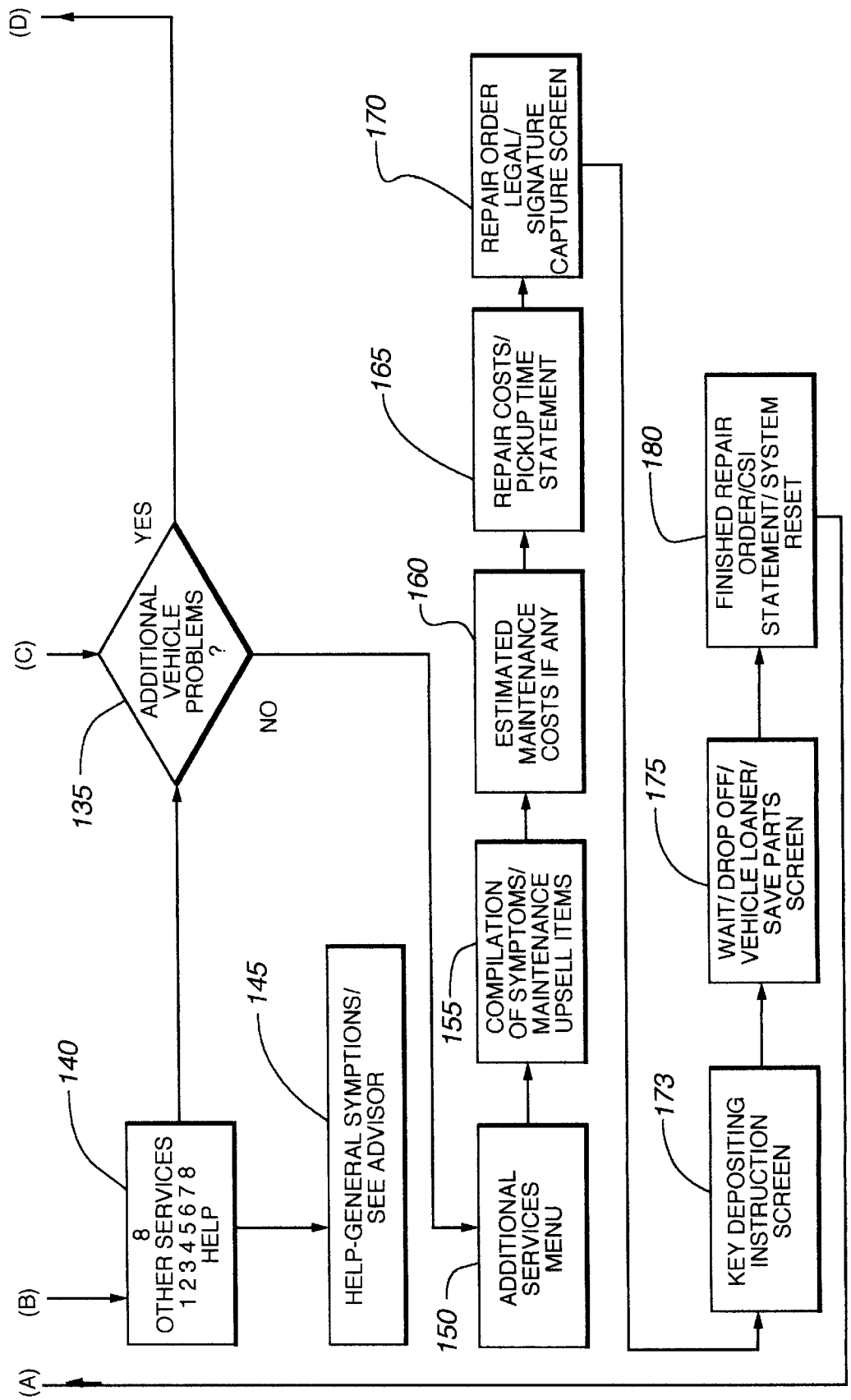

FIGS. 1 and 2 provide an overview of the systems and methods of the invention. FIG. 1 is a system overview of the invention. A customer brings an automobile to the repair center where customer interacts with customer interview terminal screen 10. This console can include a portable personal computer or, at least, a freestanding terminal serving a master computer. It comprises input means and interactive display means, preferably a touch-active CRT screen such as disclosed in U.S. Pat. Nos. 4,449,186; 5,404,443; 5,488,575; 5,499,707; 5,537,315 and 5,539,429 incorporated herein by reference. Such touch-active screens preferably incorporate audio output means, as disclosed in U.S. Pat. No. 4,449,186. The system is designed so that the hardware and software cooperate to provide convenient means for the customer to provide the necessary symptomatic information. Preferably, most information will be provided via the touch-active screen in response to a menu-driven series of queries or prompts. Some of the input information (i.e., vehicle and customer ID, credit card payment information, and the like) can be provided by inserting to the card reader 20 a credit card, or other identity card issued by the repair center to minimize effort on the part of the customer and errors as well. Such cards can be used to unlock and provide access to the console and other input devices to minimize vandalism or other unauthorized activities. Alternatively, systems can be used which automatically sense the vehicle's ID and/or the condition of the vehicle systems such as, for example, an optical/magnetic reader 40, see e.g., U.S. Pat. No. 5,058,044. To augment the preferred touch-active screens, a standard or simplified alphanumeric keyboard 30 can be provided, and optionally provisions can be made for the customer to dictate into the input system using devices such as the voice-activated system disclosed in U.S. Pat. No. 5,586,037.

In addition to the Customer's direct input of ID data, observed symptoms, and requests at this intake transaction, customer may be assisted by a service advisor or other representative of the repair center. Such representatives may enter information at the console 10, and/or use a hand-held device such as disclosed above. Optionally, readings may be taken from the vehicle's onboard computer 50 at this point using a hand-held unit or other computerized monitor. In this way, the error codes from the onboard computer can be read, analyzed, and considered in writing up the service order. This will normally be available only if the customer is willing to wait and there is a repair center representative available to take the readings unless an automatic sensor system is used as in U.S. Pat. No. 5,557,268. A service advisor may introduce information into the system via console 10, either during the customers intake transaction or thereafter. Preferably, the service advisor will employ a hand-held unit incorporating the functions of console 10.

The console displays menus, queries, prompts and input/output data on the CRT screen, and upon command or completion of the transaction prints out materials via printer 90, or other similar printers that could be attached to the system at one of the input devices or networked to computing device 70 for the customer's use.

The information inputs all enter a computing device 70 that could include a programmed computer, as shown, having a central processing unit (CPU), a device having firmware embedded into microchips, a general personal computer having specialized programming, etc. component. The information entered into the computing device 70 is analized, summarized, compiled, and correlated. The system may query the customer further to develop the input information fully before closing the transaction. When the initial information is obtained, the system prepares a service order that includes a standardized reporting of the symptomatic problems that prompted the lay person to seek repair. The present invention could be combined with a diagnostic service program that outputs a service need in the order if the needed service and/or repairs are clear. More typically, however, more information is needed to determine the service required, therefore the system can print out and display a standardized summary of the symptomatic problems containing queries for the mechanic and/or service advisor to analyze. The service mission is subject to change after readings have been taken from the vehicle's onboard computer.

A finished service order will be transmitted to mechanic service representative, technician, or other professional via printer 90 and/or console, which displays the order on a CRT screen. Using similar input means to those described for console 10, the mechanic can submit information to modify the service order, query the service advisor as to what work is approved, and advise the system when the job is completed or delayed. Such inputs will be transmitted to computing device 70 which stores and processes them. Events including job completion or delay are transmitted via suitable communications media, such as the telephone, facsimile, or e-mail, to the customer using customer notification programs. Additionally, in the process of the job, the computing device 70 can by urged to optionally identify and order materials, spare parts and the like for the service using ordering program.

FIG. 2 is a master flow sheet illustrating the operation of the computerized process outlined in FIG. 1. To initiate the intake process, the customer approaches terminal 100. Information input can be by scanner, e.g., FIGS. 12A and 12B, or other means, e.g., a typewriter. Preferably, the information is generally input by use of a touch screen. Where a numeric input is needed, a keypad will appear, e.g., 12A and 12B. Where alphabetic and numeric information is needed, an alphanumeric keypad will appear, e.g., 12C. Specific information is input into the computer of a preferred hand-held unit by stylus pressure on a square, e.g., FIG. 13E; a dot, e.g., 13F, a circle, e.g., 13G. Basic ID, and, where selected, credit card information can be provided via an ID card reader 105 and/or submitted via touch-active screen or keyboard. The information provided appears on display 110 which provides correction prompts or queries. For example, if the current vehicle mileage and phone contact information are not provided initially, they can be submitted upon request as at 115 and 120. When the necessary intake information is provided, the display shifts to the main menu 125 which offers multiple choices as well as a "Help" function. In FIG. 2, the main menu categories include the Engine/drivability (1), Noise/vibrations (2), Automatic/manual/4-wheel Drive Transmission (3), Heater/AC (4), Brakes (5), Steering/suspension (6) Power accessories/electrical (7), and Other services (8) subcategories. These categories are supplemented (See FIG. 33) for vehicles more complex than automobiles, e.g., a Peterbilt truck, and vehicle-based equipment, e.g., a cherry picker and a front loader. Each of these menu choices leads to subroutines containing multiple menu choices to guide the customer through 321 an interrogation process which will identify the symptomatio problems to be corrected and/or routine services to be performed. Exemplary flow diagrams for these subcategories are provided in subsequent figures discussed below. Upon completion of any of the subroutines 1 through 8, the display shifts to a "General Questions" subroutine 130 which queries the customer as to how often the problem occurs and similar questions. After responding to these queries, the customer is queried as to whether there are additional vehicle problems 135; if "yes", the program reverts to the main menu for further choices. Selection of the "other services" menu 140 provides options for choosing various maintenance services as well as a "Help" option which refers the customer to the service advisor as shown at 145.

Upon completion of the interrogation via the categorical subroutines, the customer is automatically transferred to "Additional Services" subroutine 150, which offers further choices discussed below for routine service operations and the like. Once the customer exits this menu, customer is transferred to subroutine 155 which uses Boolean and other processing logic to provide a compilation of the symptoms and requested service items and displays the compilation along with a menu of additional accessories or services which can be purchased. Following this, subroutine 160 provides a cost estimate of any requested maintenance services, and subroutine 165 provides a cost estimate of repair costs and pickup time. The repair work order is presented by subroutine 170, and the customer's electronic signature is captured. On signature of the repair order, instructions for leaving the key(s) in a secure depository are shown at 173. Subroutine 175 then queries whether the customer will wait for the vehicle, drop it off, or request a loaner vehicle. Subroutine 175 also queries the customer's requests with regard to the disposition of the used parts. Finally, the finished repair estimate is displayed and printed out for both the customer, service advisor and the mechanic, technician, or other professional service provider at 180.

Figure 3A:
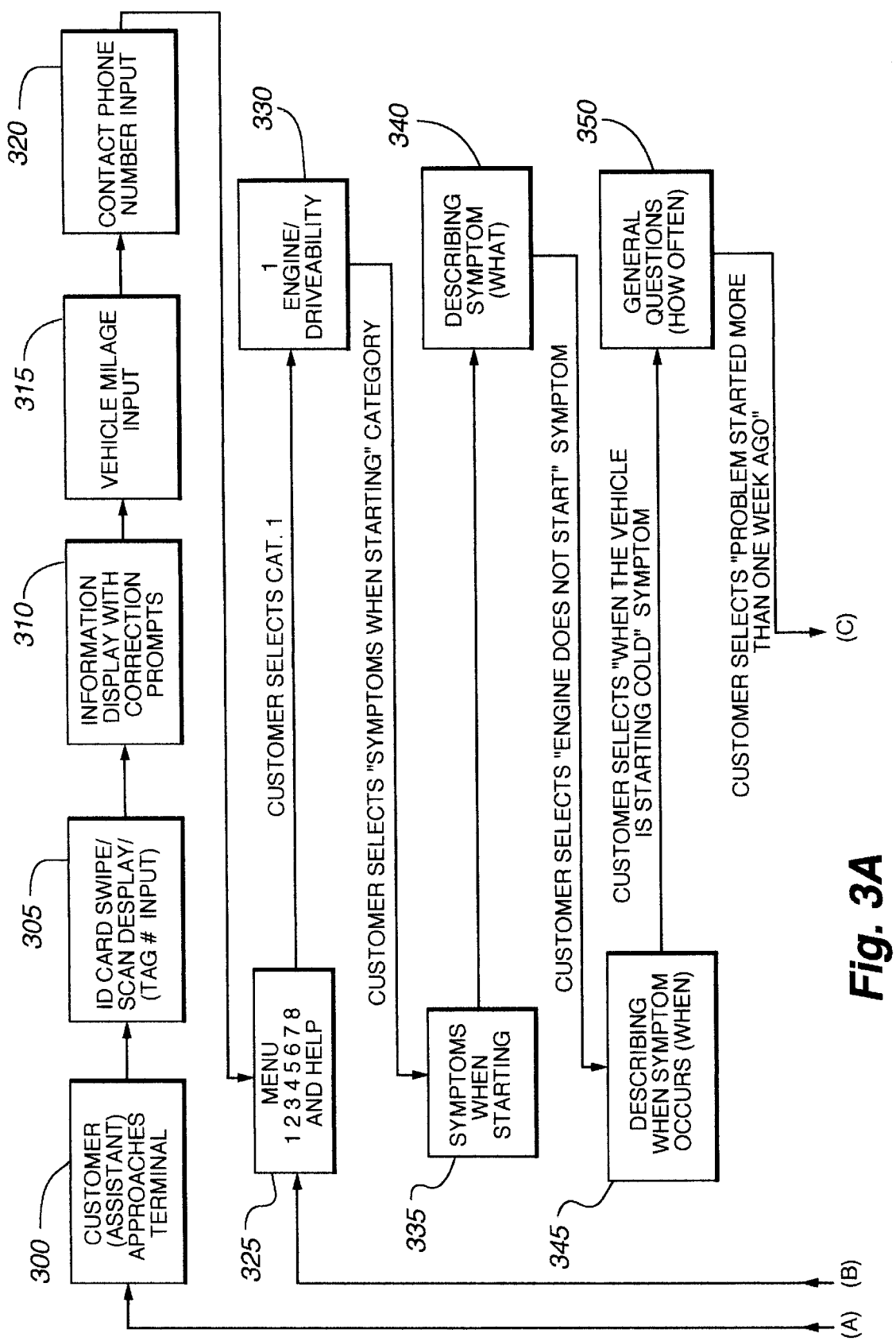
FIG. 3 illustrates a "customer service process" of using the system.
Figure 3B:
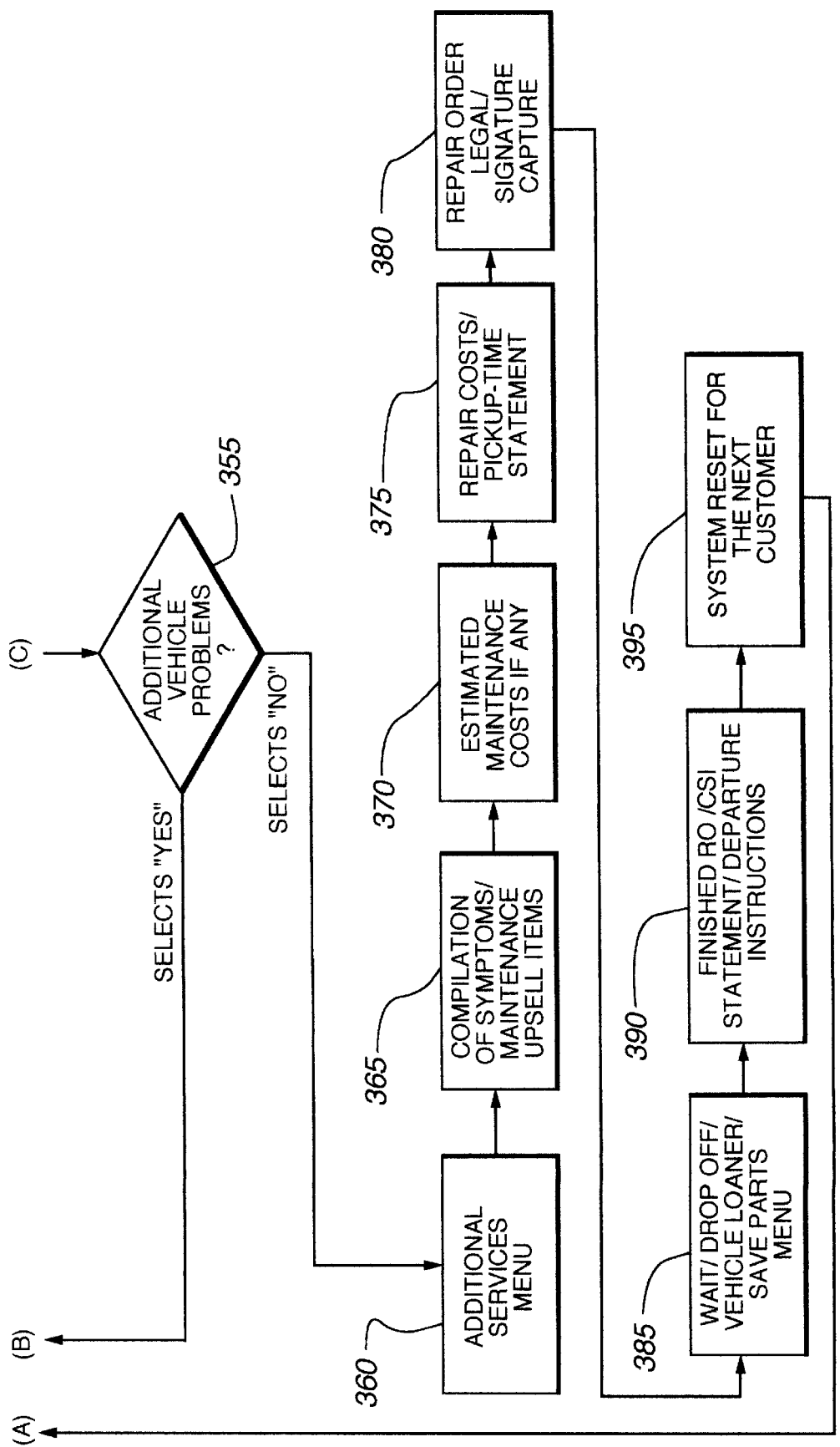

FIG. 3 illustrates a customer's interaction with the system. As in FIG. 2, a customer interacts with blocks 300, 305, 310, 315, 320, and is transferred to main menu 325. Category 1 Engine/drivability is selected by the customer at 330 and menus are presented as in FIG. 4. The customer is exposed to a succession of computer monitor screens in the course of selecting from the menu, as illustrated in FIGS. 12A to 12G. As shown in FIG. 3, the customer selects the "Symptoms when starting category at 335, and thereafter is called upon to describe the symptoms at 340 and when they occur at 345. After the selection of the latter, the system transfers to the "General questions", subroutine 350. After this question is answered, the system transfers to the "Additional vehicle problems", subroutine 355. In this case, the customer selects "NO", and is transferred to the "additional services" menu 360. Since the customer chooses no additional services, the system compiles and summarizes the symptoms and any requested maintenance services at 365 and presents the customer with a menu of additional merchandise and services which can be purchased. Subroutine 370 presents the customer with the estimated maintenance costs (if any), and subroutine 375 presents a statement of estimated repair costs and pickup time. The system then captures the customer's signature 380, queries as to whether customer will wait or drop off the vehicle 385 with the repair organization, whether a loaner is required, and whether parts are to be returned as shown in block 385. Finally, the finished repair order is displayed and printed for both customer and mechanic at 390. The system resets for the next customer at 395.

Figure 4:
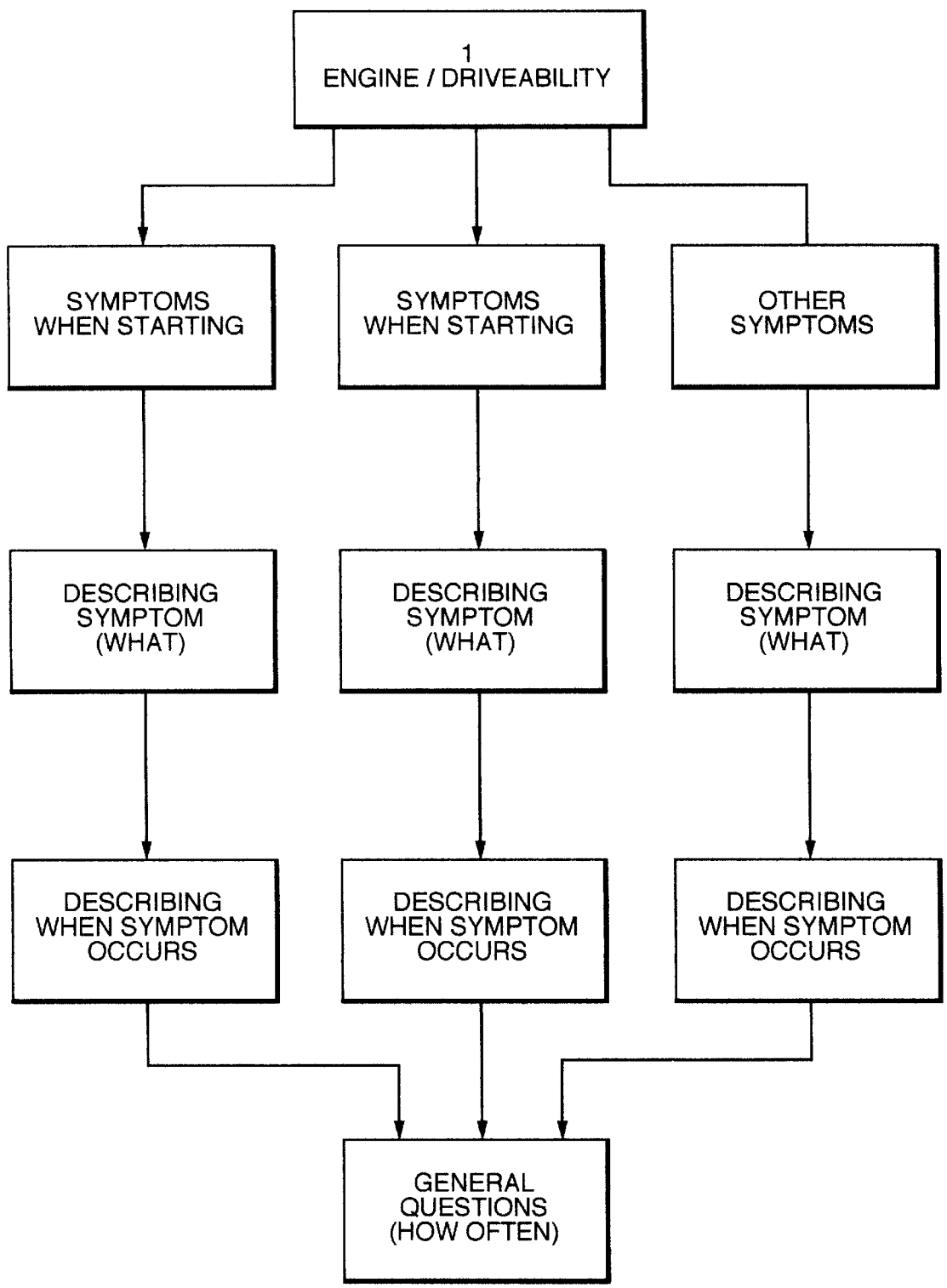
FIGS. 4–11 are queries for each of the subcategories of FIG. 2.
Figure 5:
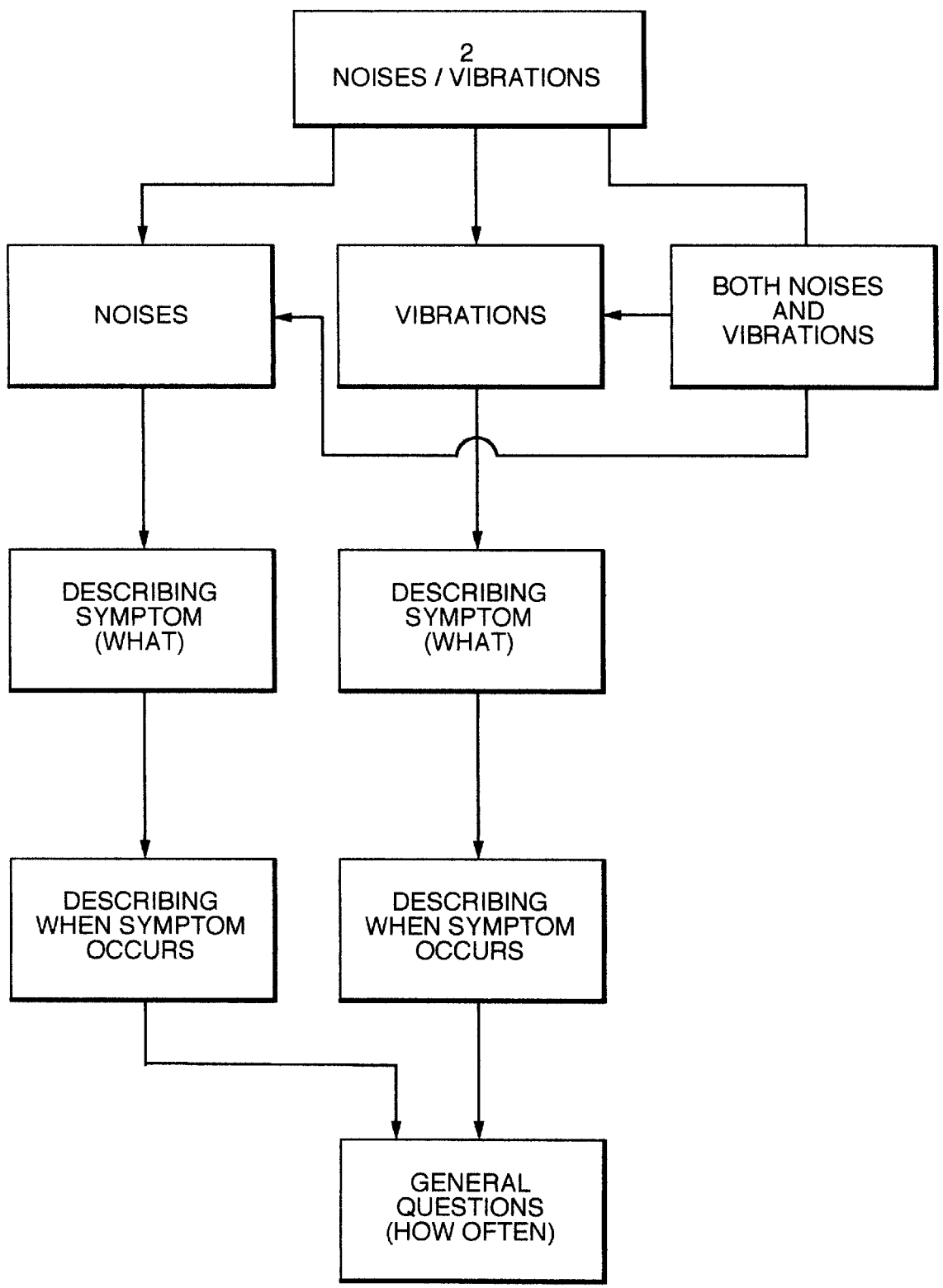

FIG. 4 illustrates the operation of the "Engine/drivability" menu (category 1). The customer is initially presented with a choice as to describing symptoms which occur when starting or driving, or "Other symptoms". Given any of these three choices, the customer is asked to describe the nature of the symptoms, then queried to describe when the symptoms occur. Optionally, inputs from the service computer can be provided at this point to provide further information on the nature of the symptoms and when they occur. After these questions are answered, the subroutine transitions to a "General Questions" subroutine to describe 'how often the symptoms occur. From General Questions, the customer selects whether or not there are Additional Vehicle Problems. If none, customer proceeds to Additional Services; if "yes" is answered, customer is returned to the Main Menu to make another choice, FIG. 5 illustrates the menu choices for "Noise/vibrations" (Category 2). The initial menu allows the customer to select noises or vibrations alone or a combination of both. Whatever the choice, the customer will be queried as to what the nature of the symptoms are, when they occur and where the symptom occurs. Input from the service computer can be provided to assist in the analysis. Finally, the customer is queried as to "how often" the symptoms occur. At this point, the computer advances to "Additional Vehicles Problems" 135.

Figure 6:
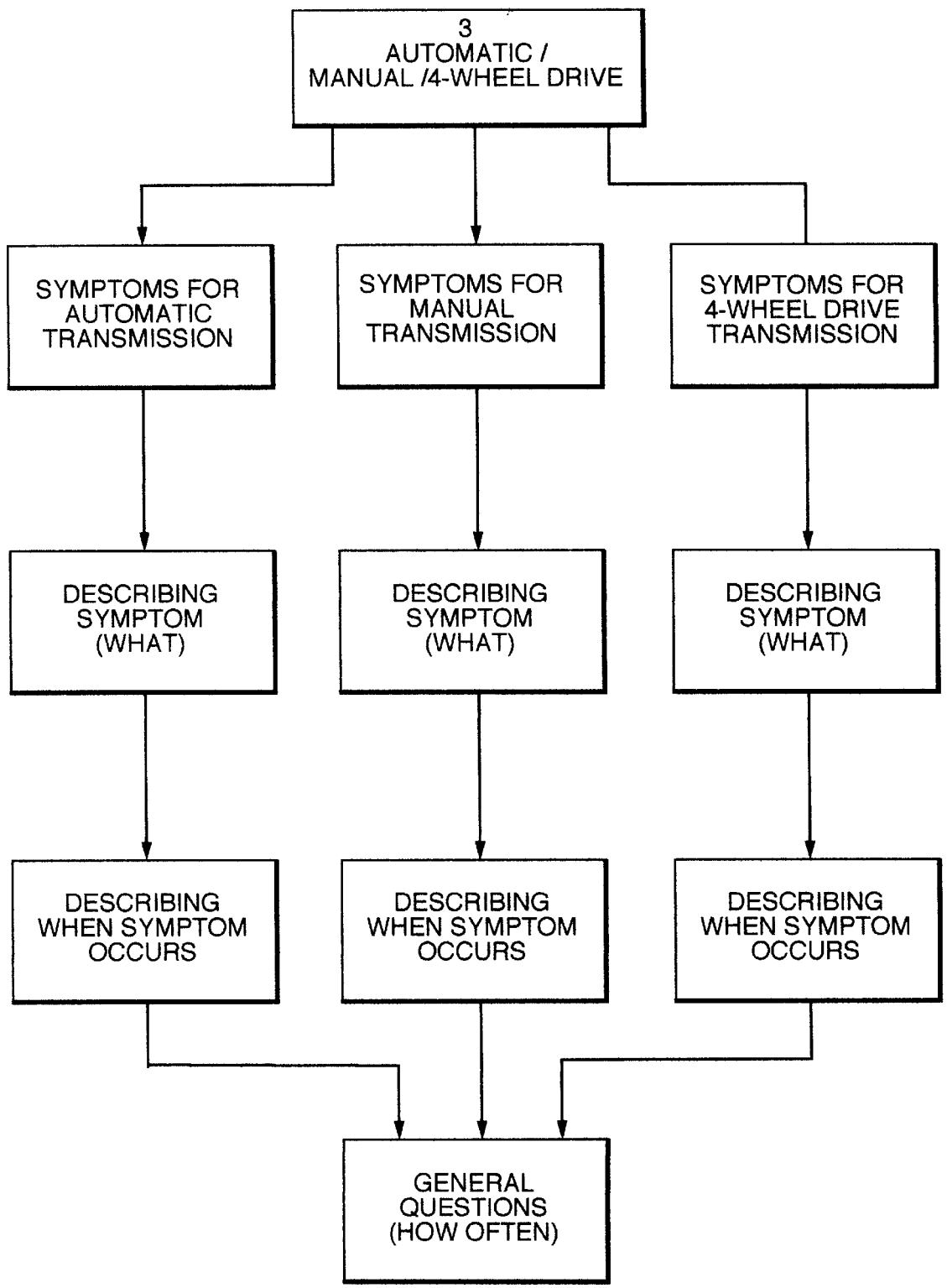

FIG. 6. illustrates menu choices for a "Automatic/manual/4-wheel drive" transmission check (Category 3). The initial menu requires selection as to automatic or manual transmissions or the 4-wheel drive. Once a selection is made, the customer is queried as to the nature of the symptoms and when they occur. After these questions are answered, the customer is queried as to how often the symptoms occur. After all these questions are answered for a subcategory, the customer is queried as to whether there are problems in another subcategory. If not, the system moves to the closing sequence If the customer indicates that there are problems in another subcategory, (e.g., problems with the 4-wheel drive in addition to the transmission), the computer returns to the main menu 125 for another selection.

Figure 7:
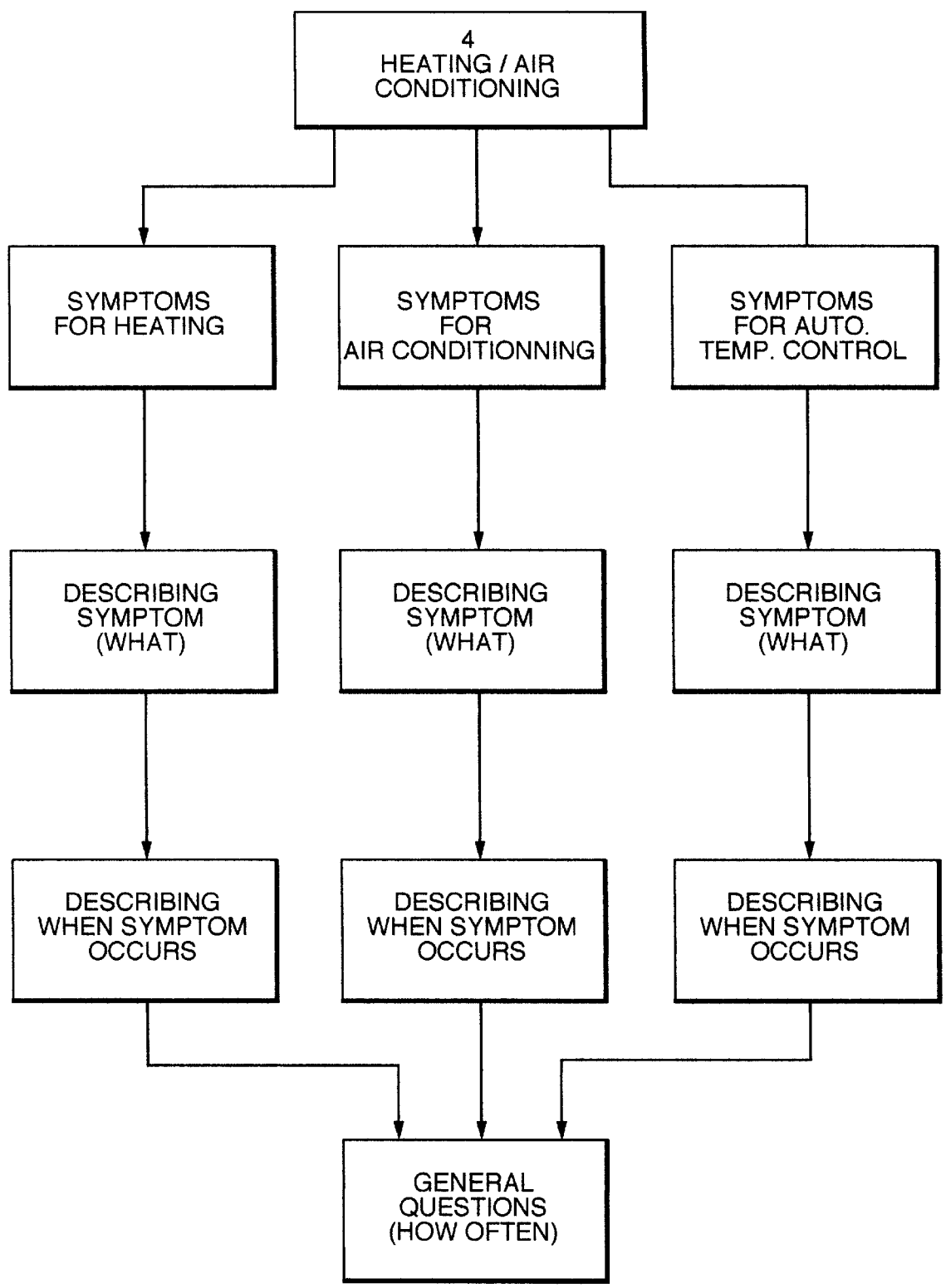

FIG. 7 illustrates the operation of the menu for "Heating/Air Conditioning" (Category 4). The initial menu selections are for symptoms of heating, air conditioning or automatic temperature control. Once a subcategory is selected, the customer is again called upon to describe the nature of the symptoms and when they occur. These questions answered, the system transitions to "General Questions" including how often the symptoms occur. After these questions are answered, the customer is called upon to declare whether there are additional problems in other subcategories. If not, the closing sequence is actuated. If so, customer is returned to the menu 125 to make another selection.

Figure 8:
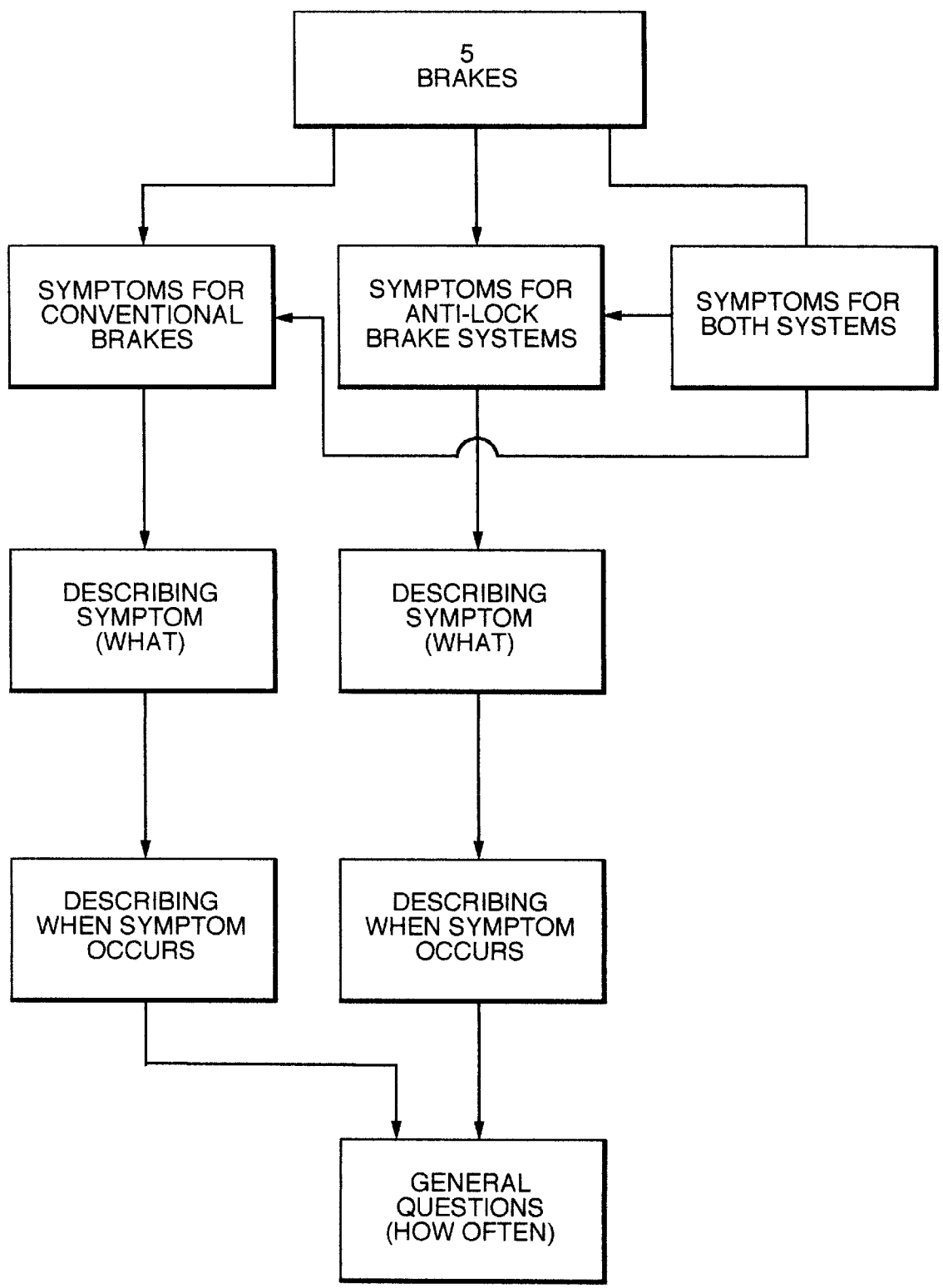

FIG. 8 illustrates the menu choices for "Brakes" (Category 5). The initial menu selections are for conventional brakes, anti-lock brake systems, or combinations of both. As in the other categories, the customer is called upon to describe the nature of the symptoms, when they occur, and how often they occur before returning to the main menu or going through the closing sequence.

Figure 9:
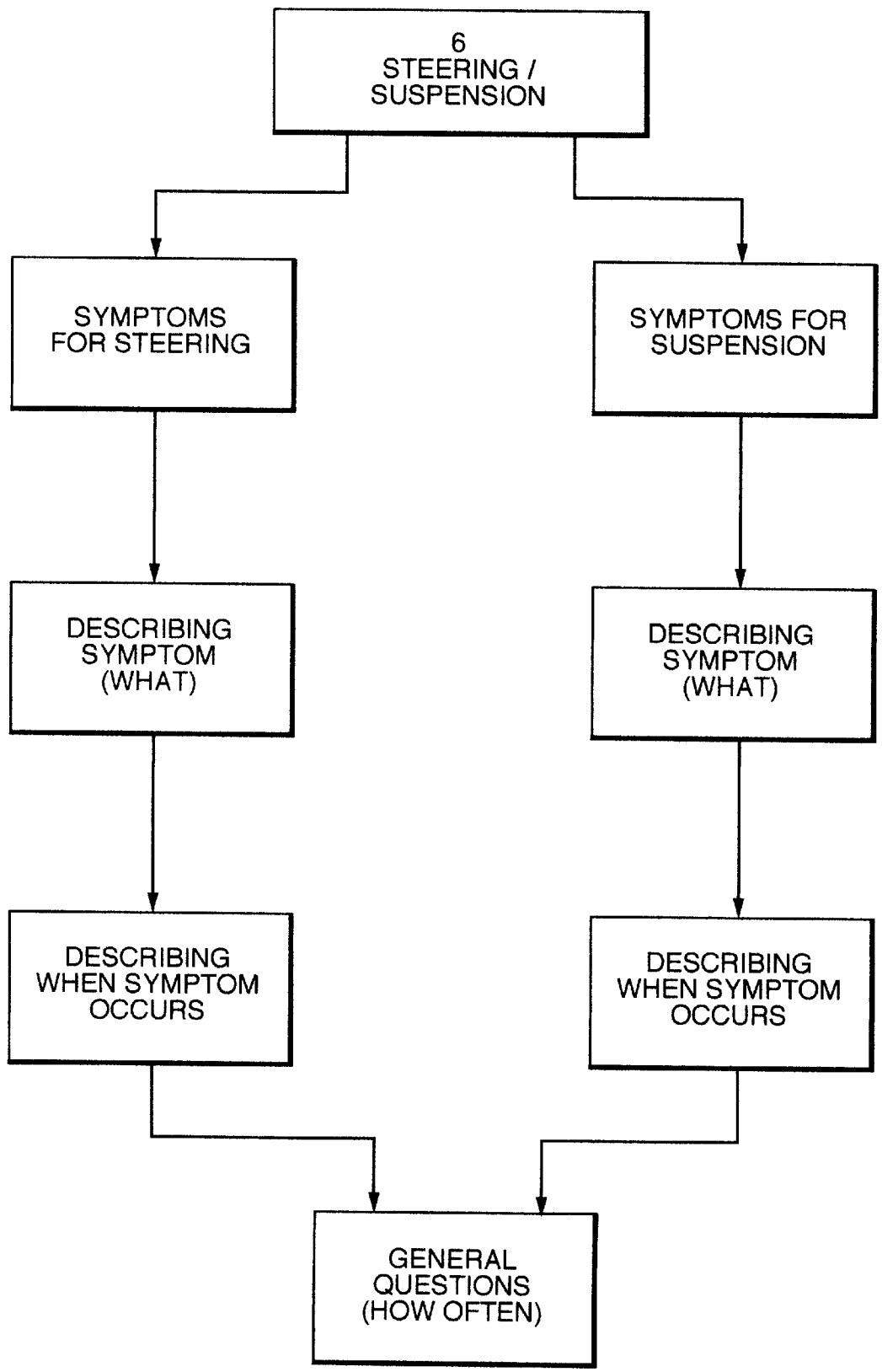

FIG. 9 illustrates the menu choices for "Steering/Suspension" (Category 6). The initial menu choices are for steering or suspension problems, and after making a selection, the customer is called upon to describe the nature of the symptoms, when they occur, and how often they occur. After these questions are answered, the customer is queried whether there are any symptoms in the other subcategory (e.g., suspension in addition to steering). It not, customer is returned to the main menu or passed through the closing sequence.

Figure 10:
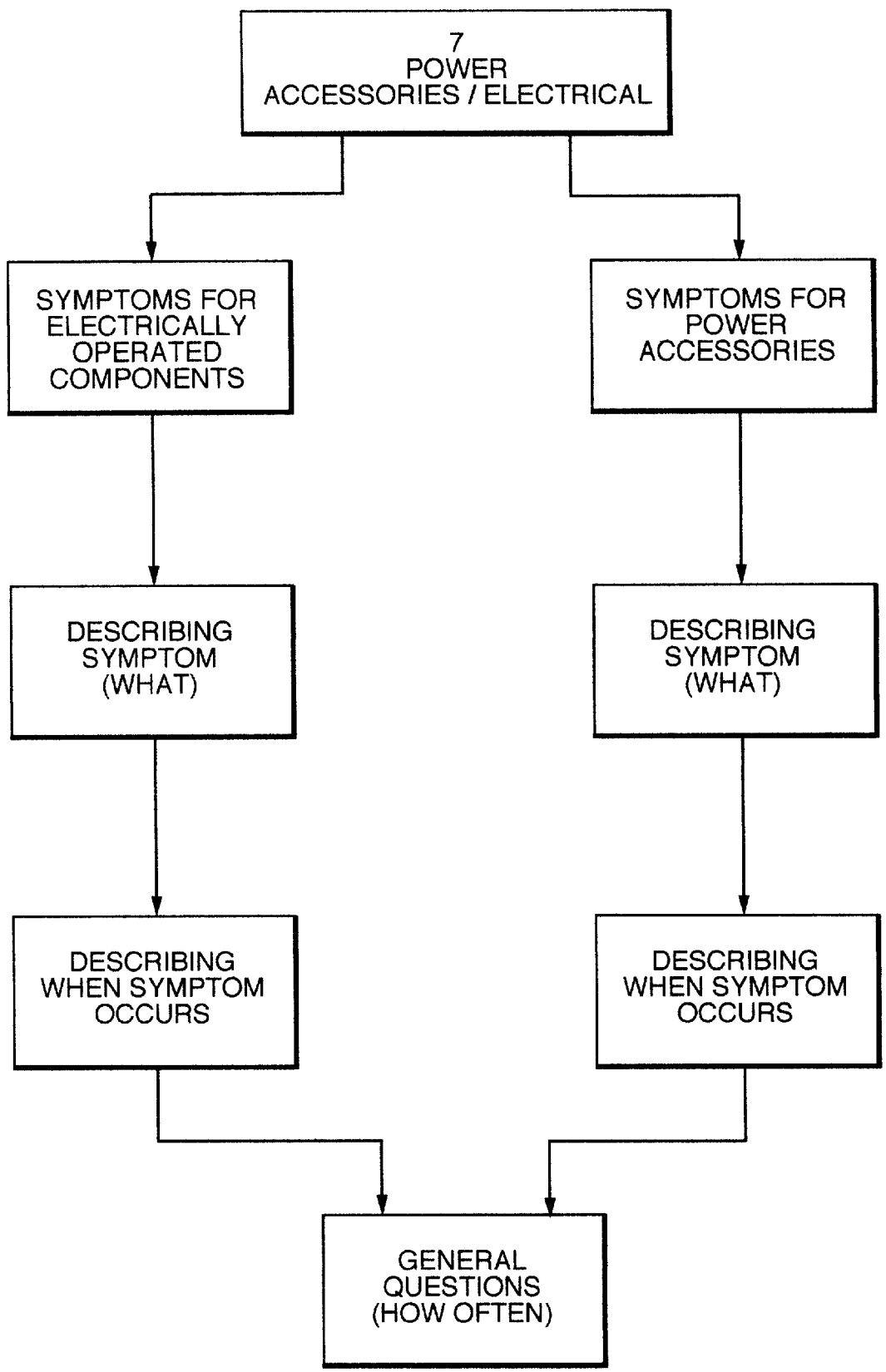

FIG. 10 illustrates the menu choices for "Power Accessories/Electrical' (Category 7). The initial menu choices are for electrically operated components and power accessories, and once a selection is made, the customer is queried as to the nature of the symptoms, when they occur, and where they occur. Once these questions are answered, the customer is queried as to how often the symptoms occur. Upon completion of these questions, the customer is queried as to whether symptoms exist in another subcategory. If not, the customer is returned to the main menu or to the closing sequence.

Figure 11:
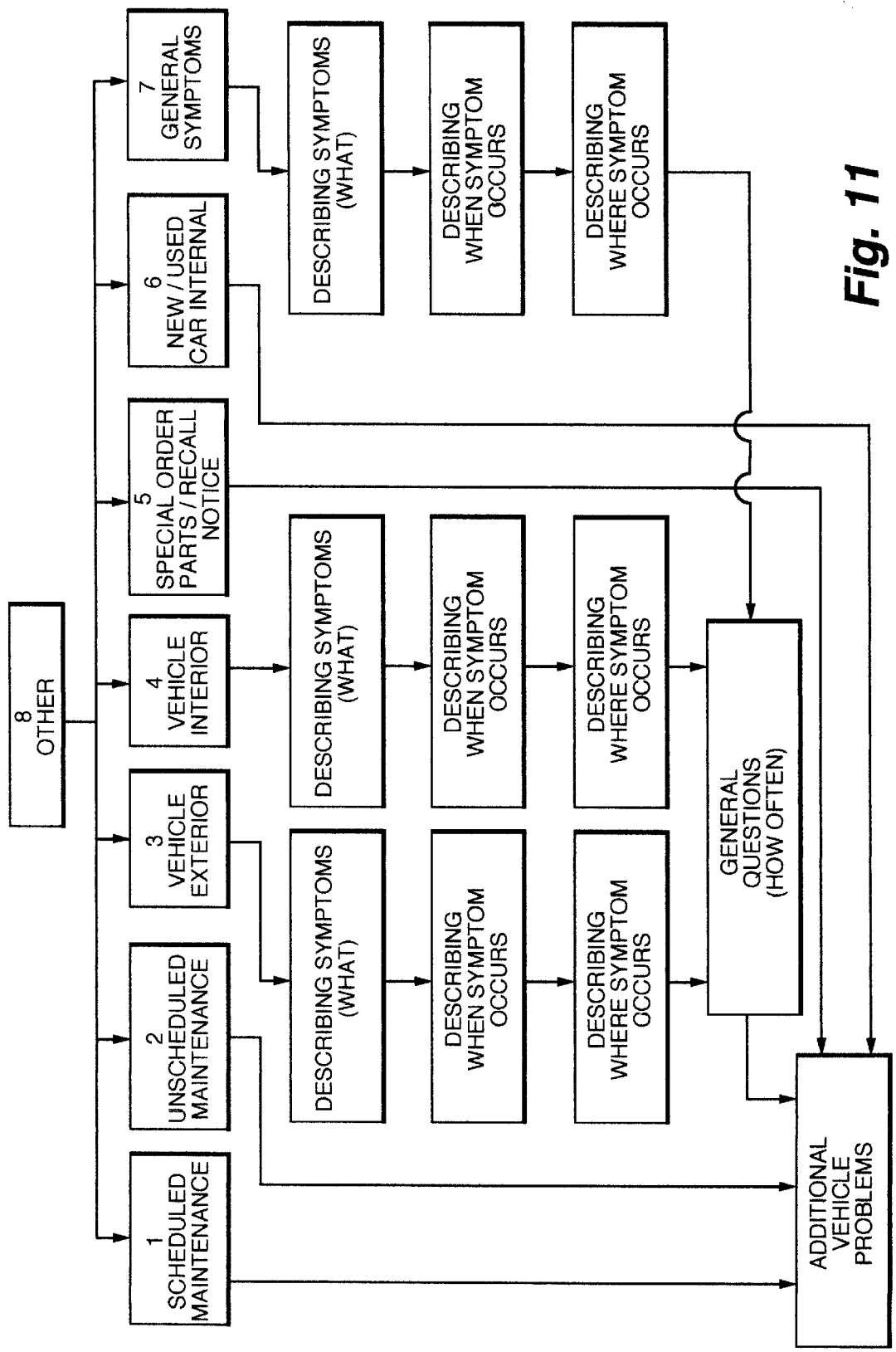

FIG. 11 illustrates the menu operation for "Other" problems (Category 8), The initial menu choices are scheduled and unscheduled maintenance, i.e. maintenance which is conducted at predetermined total mileage figures or at periodic mileage/time intervals. Once selections are made for any required maintenance in these subcategories, the system queries the customer regarding "Additional Vehicle Problems". Subcategories 3 and 4 provide menu choices regarding problems with the vehicle exterior and interior. Having selected one of these subcategories, the customer is queried as to the nature of the symptoms, when they occur, and where they occur before being asked general questions including how often they occur. When queries and answers for each subcategory are completed, the customer is queried as to whether problems/symptoms exist in other subcategories. If so, customer is returned to the main menu for another selection or progresses through closing sequence. Subcategory 5 covers special orders or parts and recall notice items. Subcategory 6 deals with new or used-car problems. In subcategory 7, "General Symptoms", the customer is again called upon to describe the nature of the symptoms, when they occur, and where they occur then how often the symptoms occur.

Figures 12A, 12B:
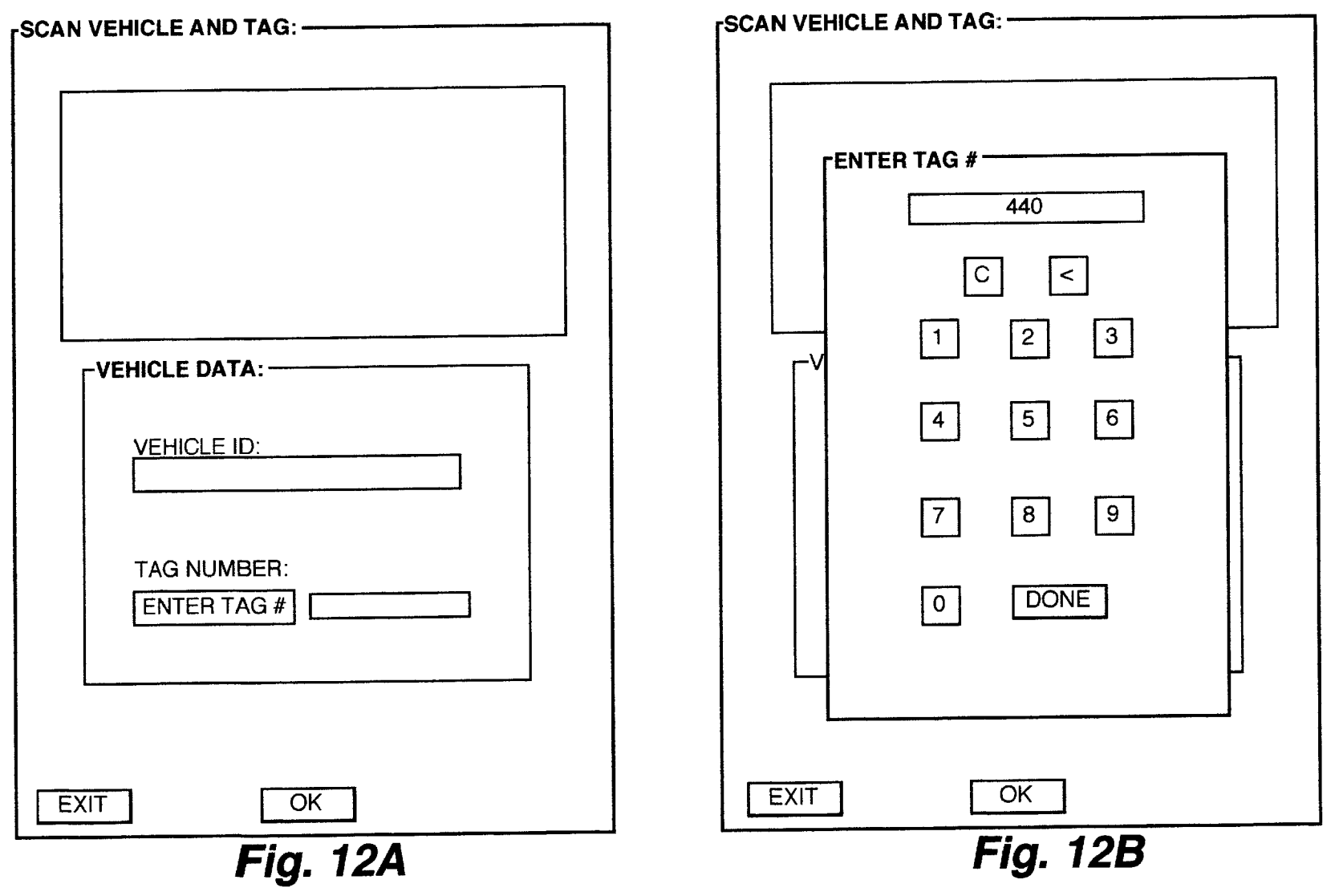
Figure 12F:
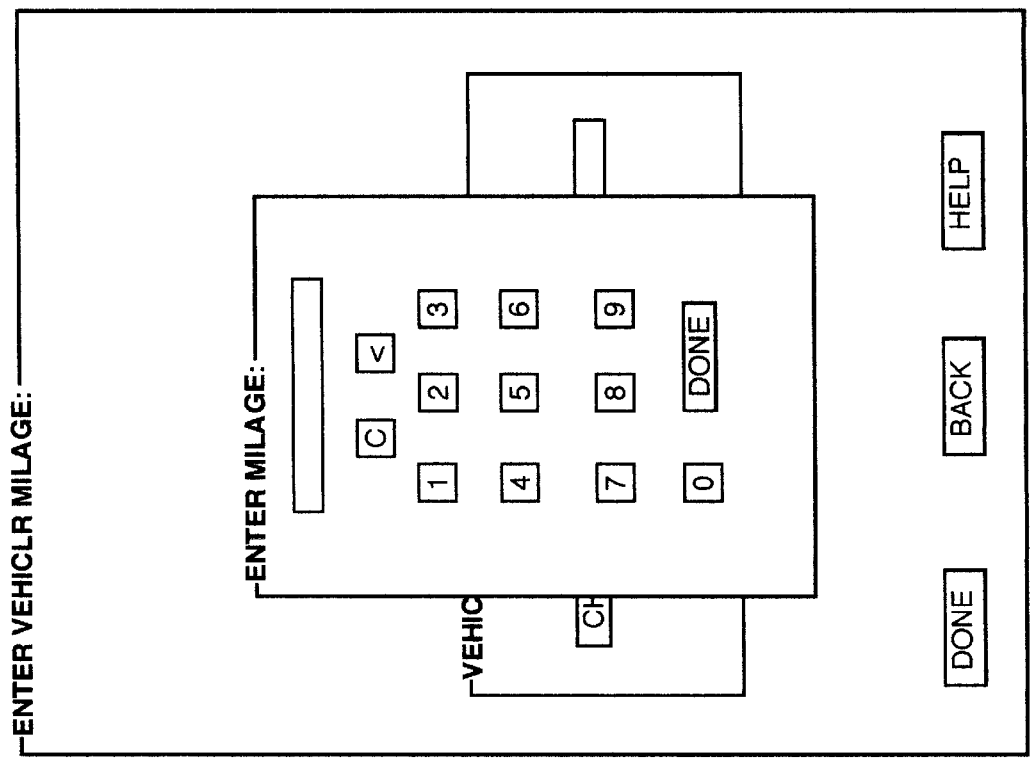
Figure 12E:
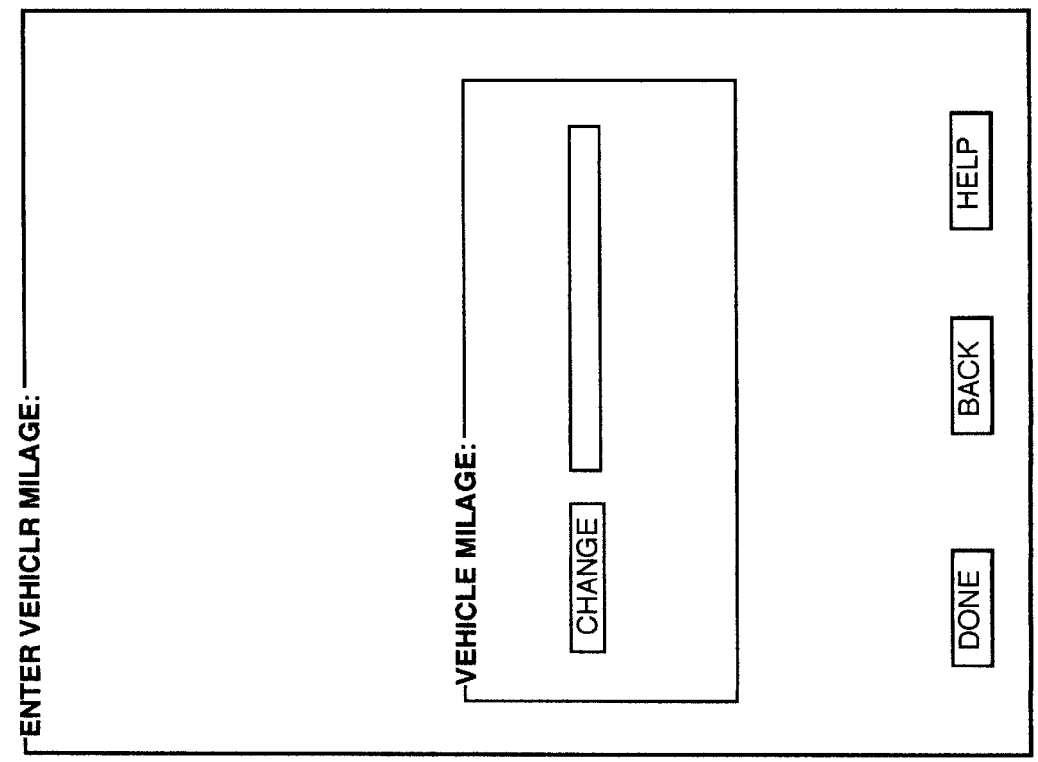

FIGS. 12A and 12B illustrate computer screens which relate to information obtained by optic, magnetic or rf (including microwave) scanning. As shown in FIGS. 12B and 12C, information may also be input means, no specification shown. FIGS. 12C–12D illustrate screens which enable the customer to input personal information. FIGS. 12E and 12F are illustrative of screens enabling the customer to input "Mileage" by pressing a "change" designator to bring up a numeric keypad. FIG. 12G similarly enables the customer to enter a telephone number for contact during the period the car is in the shop. An illustrative keypad screen is omitted.

FIG. 13 illustrates screens for the selection of one or more repair categories. Category 1, "Engine/Drivability" has been selected as indicated by the outline around that category.

FIGS. 14A to 14D illustrate computer monitor screens for the "Category 1" program. FIG. 14A identifies the category and asks for the selection of "Symptoms." FIG. 14B illustrates a screen for "Symptoms when starting." FIG. 14C illustrates the screen for "When do you notice it", i.e., the questions about the nature and frequency of the symptoms. FIG. 14D illustrates the screen querying the customer regarding "Symptoms when driving".

Figure 15D:
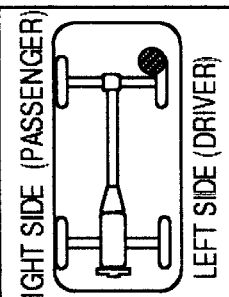
Figure 15C:
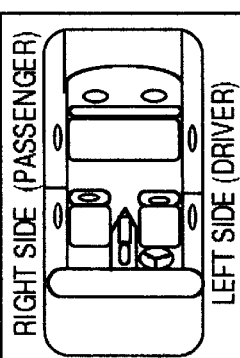

FIGS. 15A to 15E illustrate selected computer monitor screens for "Noises and Vibrations", the Category 2, program. FIG. 15A illustrates a computer screen representing the selection of the "Noise or Vibration" category, including selections for noises and/or vibrations. FIG. 15B illustrates a screen representing the selection of the "Noise information" subcategory. FIG. 15C illustrates the screen presenting the query "Where is it coming from?" via a diagram. FIG. 15D illustrates a screen querying "When does it happen" containing generic questions pertaining to noises and/or vibrations. FIG. 15E illustrates the screen requiring the selection of vibrational categories. "Shudder" has been selected.

FIGS. 16A to 16E illustrate selected computer monitor screens for a Category 3, "Automatic/Manual/4 Wheel Drive Transmission" program.

FIG. 16A illustrates the computer screen for the category of "Transmission" information, offering choices for automatic or manual transmissions or an exemplary 4-wheel drive. FIG. 16B illustrates the screen for the "Automatic transmission" subcategory offering choices as to types of symptoms observed. FIG. 16C illustrates the screen for the "Manual transmission" subcategory, offering choices of various symptoms observed. FIG. 16D illustrates a screen for "4-wheel drive transmissions" subcategory offering choices as to various symptoms observed. FIG. 16E illustrates a screen querying 'When does it happen", with a set of generic questions applicable to any of the subcategories.

FIGS. 17A to 17E illustrate selected computer monitor screens for the category 4, "Heater/AC" program. FIG. 17A illustrates the computer screen for defining the Heating or Air Conditioning problem. FIG. 17B illustrates a screen for the 'Heating" category. FIG. 17C illustrates a screen for the "Air Conditioning" category. FIG. 17D illustrates a screen for the automatic temperature control system. FIG. 17E illustrates a screen providing questions as to "When does it happen."

FIGS. 18A to 18D illustrate selected computer monitor screens for the category 5 "Brakes" program. FIG. 18A illustrates a computer screen for defining the particular brake system. FIG. 18B illustrates a screen for defining the problem with a conventional braking system. FIG. 18C illustrates a screen for defining problems with regard to an anti-lock braking system. FIG. 18D illustrates a screen querying "When does it happen."

FIGS. 19A to 19D illustrate selected computer monitor screens for the category 6, "Steering and Suspension" program. FIG. 19A illustrates a computer screen for defining whether the problem relates to steering or suspension. FIG. 19B illustrates the screen for the "Steering information" subcategory including questions regarding various symptoms observed with regard to the steering. FIG. 19C illustrates the screen for the "suspension" subcategory, including questions regarding various symptoms observed. FIG. 19D illustrates the screen for "When does it happen" including questions regarding the operating modes and speed when either steering or suspension symptoms occur.

Figures 20E, 20F:
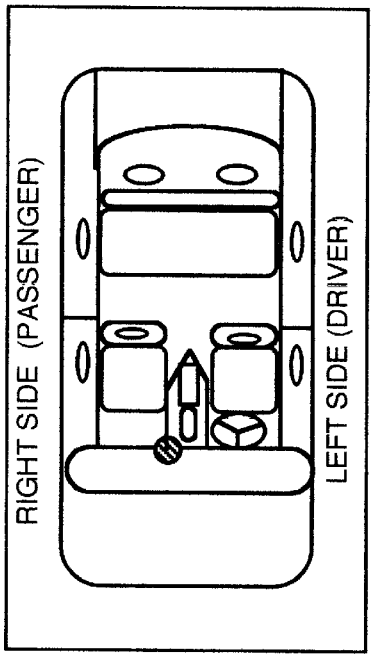

FIGS. 20A to 20F illustrate selected computer monitor screens for the "Electrical" program. FIG. 20A illustrates a computer screen offering choices of problems connected with "electrically operated components" or "power accessories". FIG. 20B illustrates a screen which includes questions regarding the specific components requiring service. FIG. 20C illustrates a screen including questions regarding "Power accessories" where the symptoms are observed. FIG. 20D illustrates a screen for narrowing the search terms. FIG. 20E illustrates the screen for "When does it happen". FIG. 20F illustrates a screen for identifying the area where the problem is located.

Figure 21F:
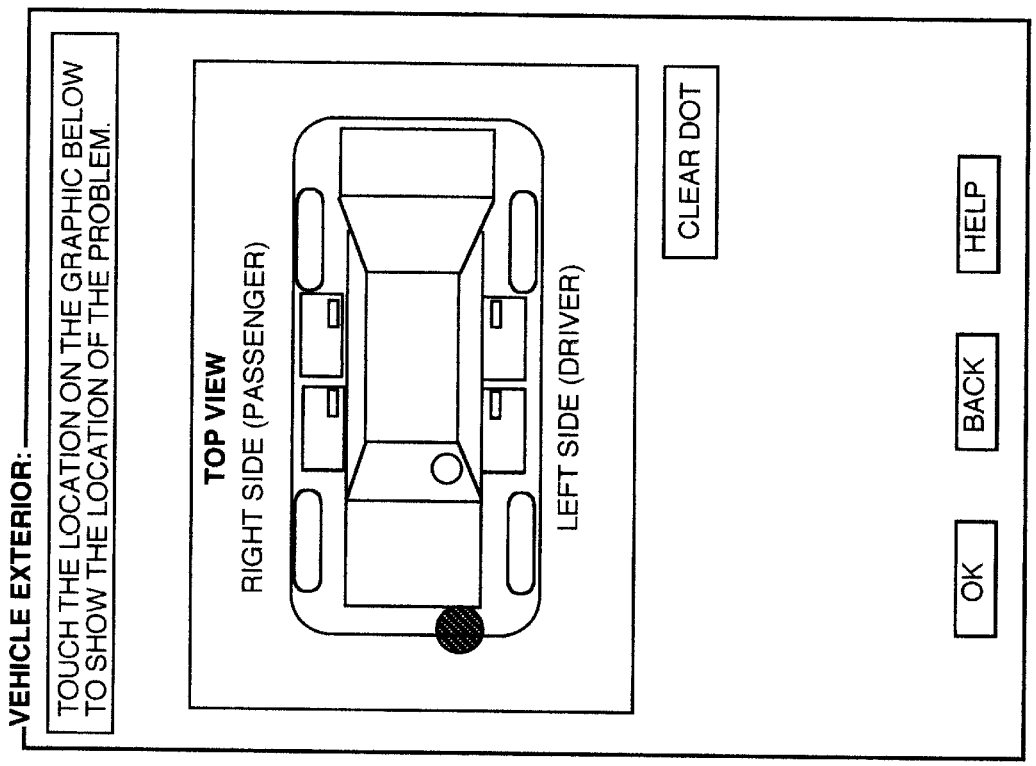
Figure 21E:
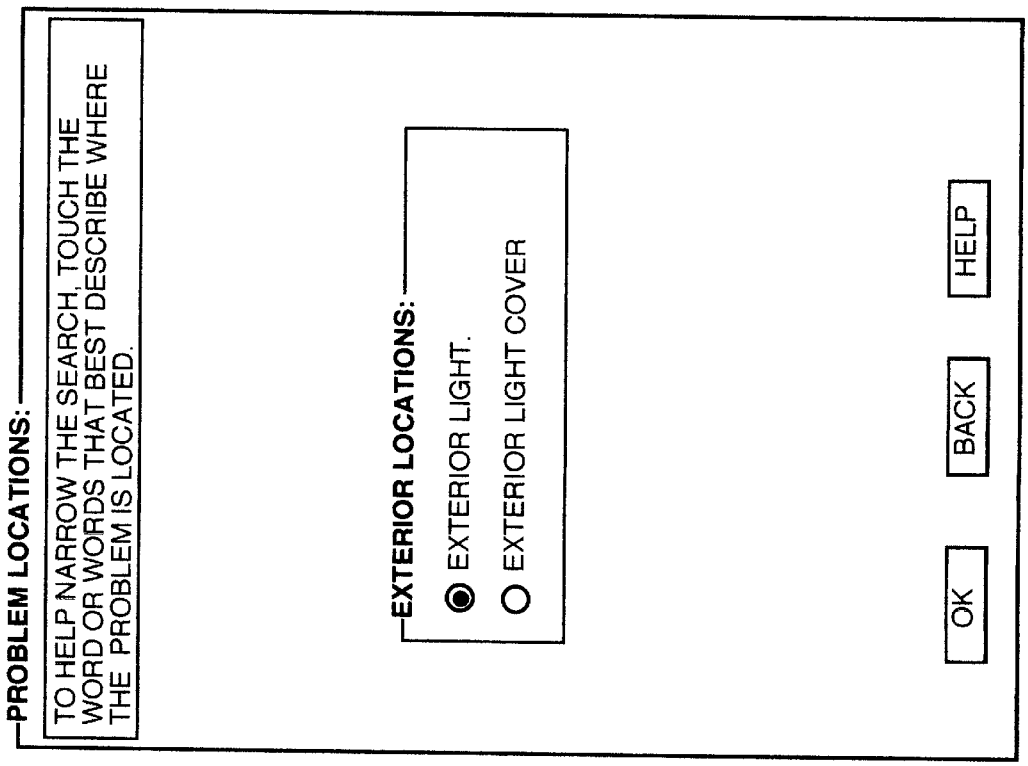
Figure 21L:
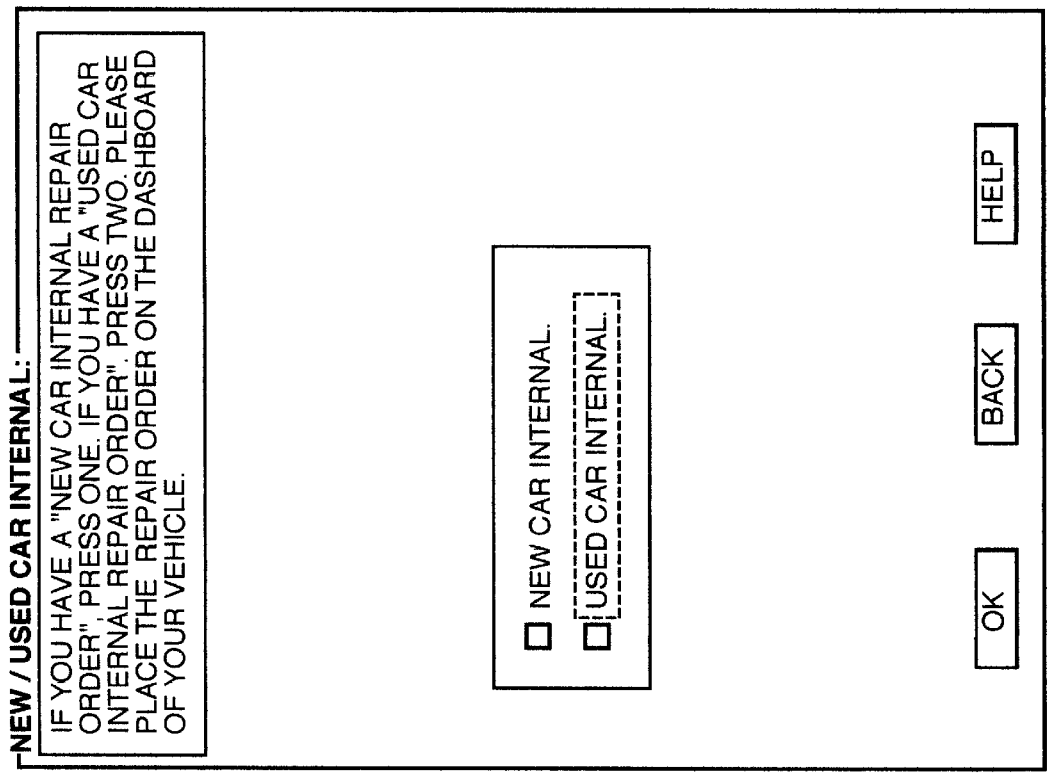
Figure 21K:
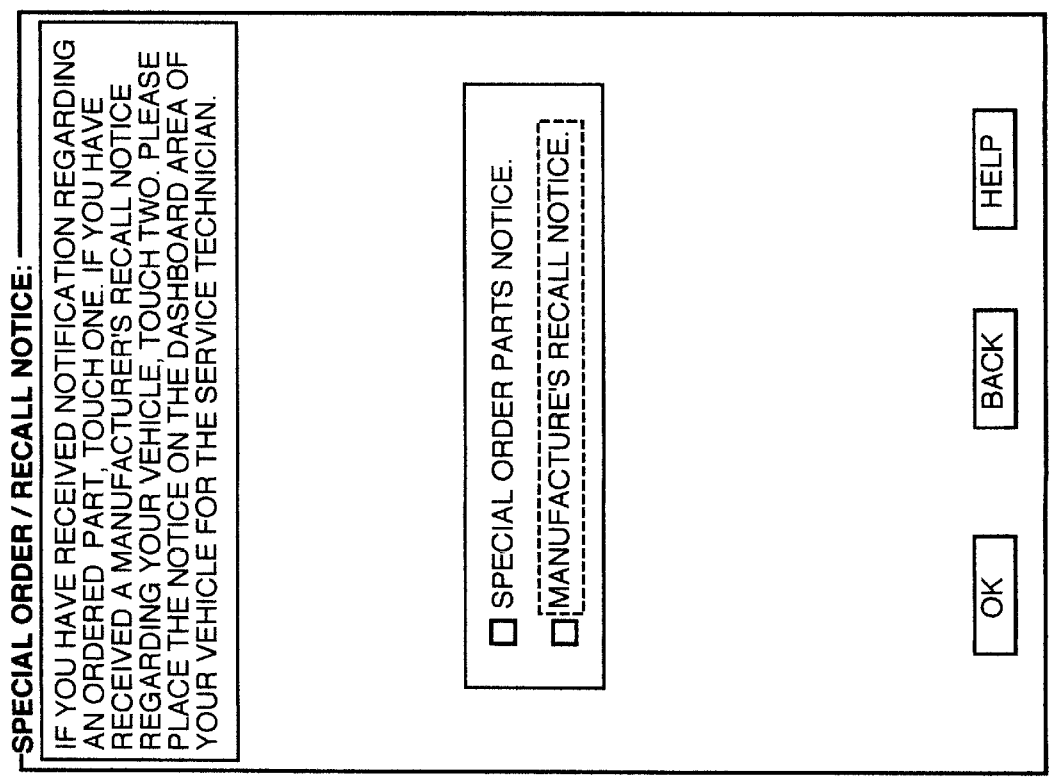
Figure 22A:
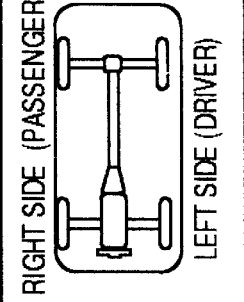
Figure 21S:
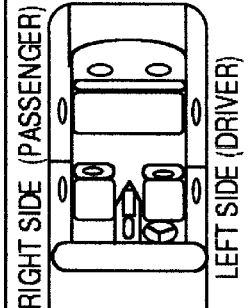

FIGS. 21A to 21S illustrate selected computer screens for the "Other services" program. FIG. 21A illustrates a screen for "Other services available" offering menu choices for scheduled and unscheduled maintenance, vehicle exterior and interior, special order parts and recall notices, new- or used-car internal and general symptoms. FIG. 21B illustrates a screen for "Scheduled maintenance" and FIG. 21C illustrates a screen for Unscheduled maintenance. FIG. 21D illustrates a screen for "Vehicle exterior"subcategory including questions regarding the area(s) in which the problem is occurring. FIG. 21E–21I provide problem location selections. FIG. 21E illustrates a screen requesting information on the problem location. The FIG. 21F illustrates a screen for locating a problem on the vehicle exterior via a diagram. FIG. 21G illustrates a computer screen for the 'Vehicle interior" subcategory, including questions regarding the area where the problem is occurring. FIG. 21H illustrates a screen for the "Problem location" in subcategory of 'Vehicle interior lighting". FIG. 21I is illustrative of a screen for locating problems via a diagram. FIG. 21J illustrates a screen for describing the problem. FIG. 21K illustrates a screen for information regarding a special order or recall notice. FIG. 21L illustrates the screen for a "new car" or "used car" internal repair order. FIGS. 21M–21S illustrate screens for identifying things the customer sees, hears, smells and feels under the "help" category 140 of FIG. 2 and asks "When" and "Where."

FIGS. 22A to 22D illustrate selected computer screens for "General Questions, Other Symptoms and Return Problems."

FIG. 23A illustrates an "Additional problems" screen.

FIG. 24 illustrates a screen for selecting "Unscheduled services" and includes prices for those services.

Figure 25A:
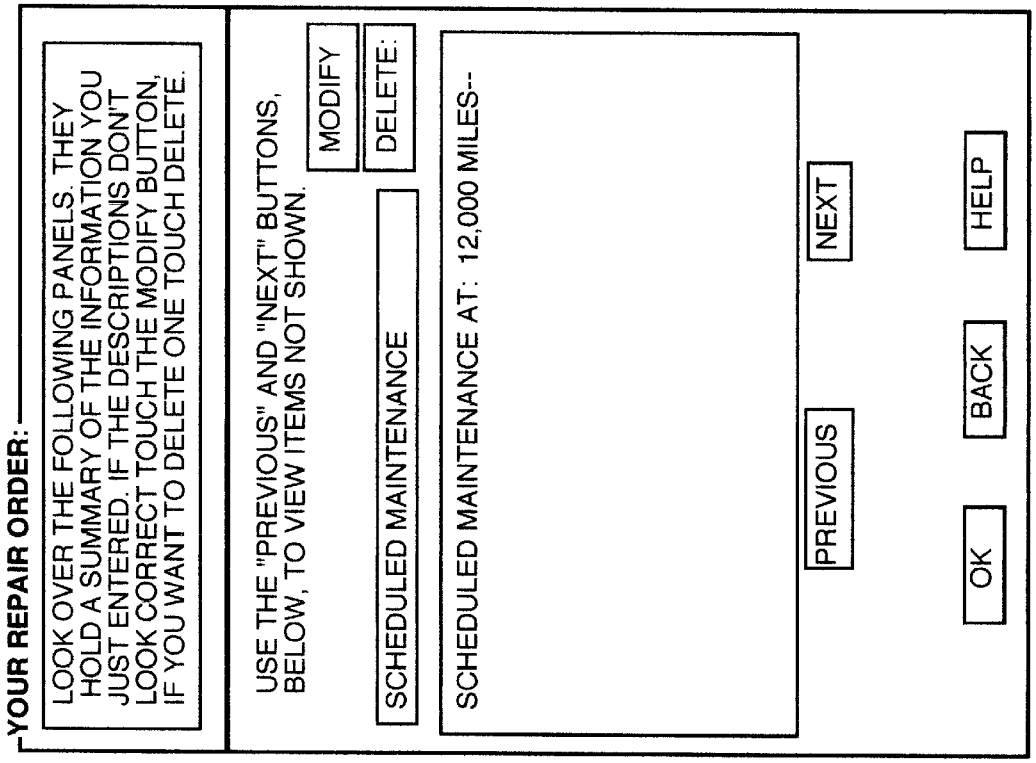
Figure 25B:
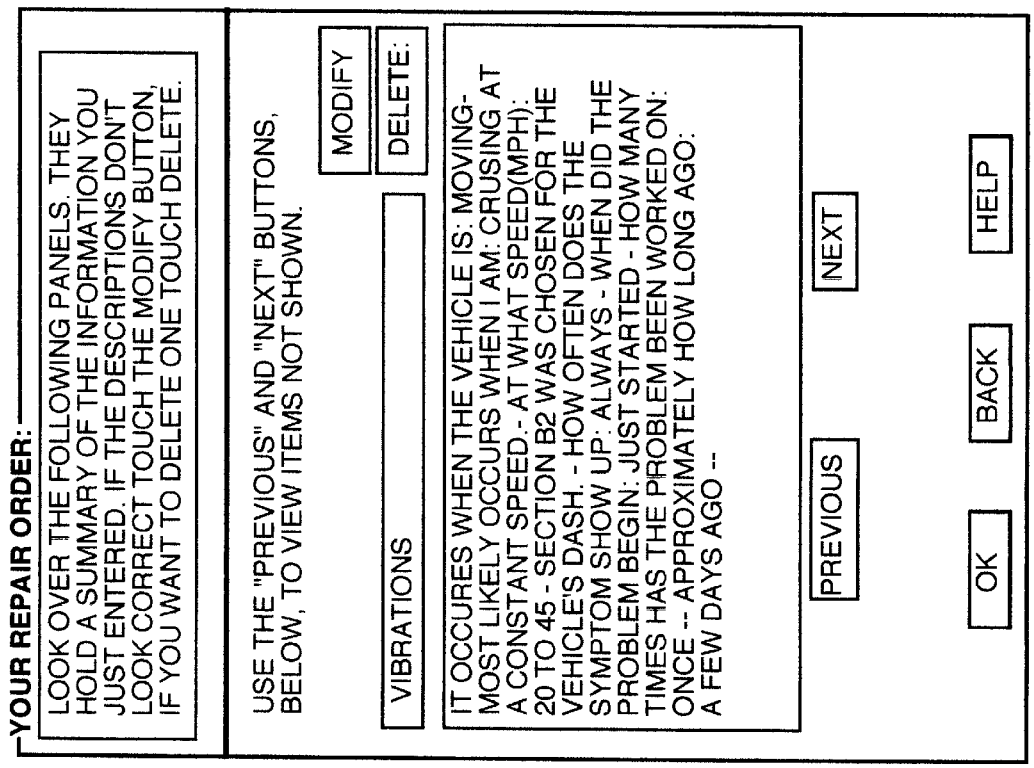

FIGS. 25A and 25B are screens requesting that the customer review the previously input material.

FIGS. 26 and 27 illustrate screens for providing an estimate of cost and pick-up time.

FIG. 28 illustrates a screen for acknowledgment and capture of customer signature. This corresponds to block 170 on FIG. 2.

FIG. 29 illustrates a screen instructing the customer to deposit the vehicle keys in an appropriate lockbox.

FIG. 30 illustrates a screen for selection of "wait", "drop off, or a loaner."

Figure 31A:
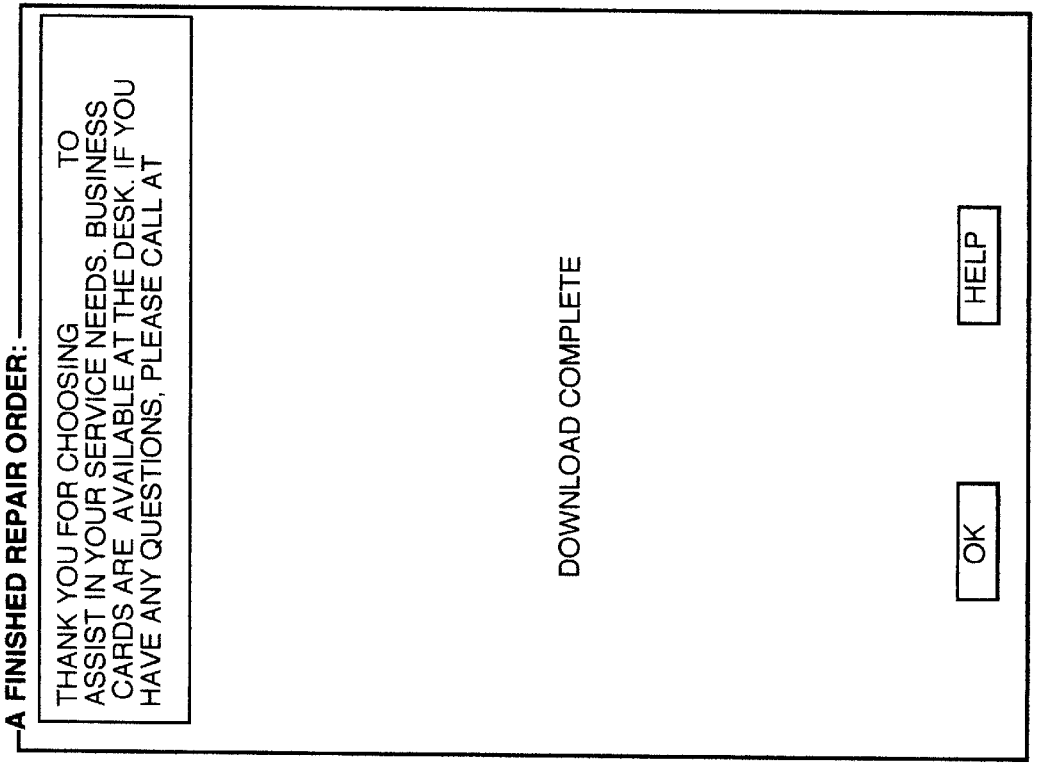
FIGS. 31A and 31B illustrate screens relating to the acceptance of the finished repair order.
Figure 31B:
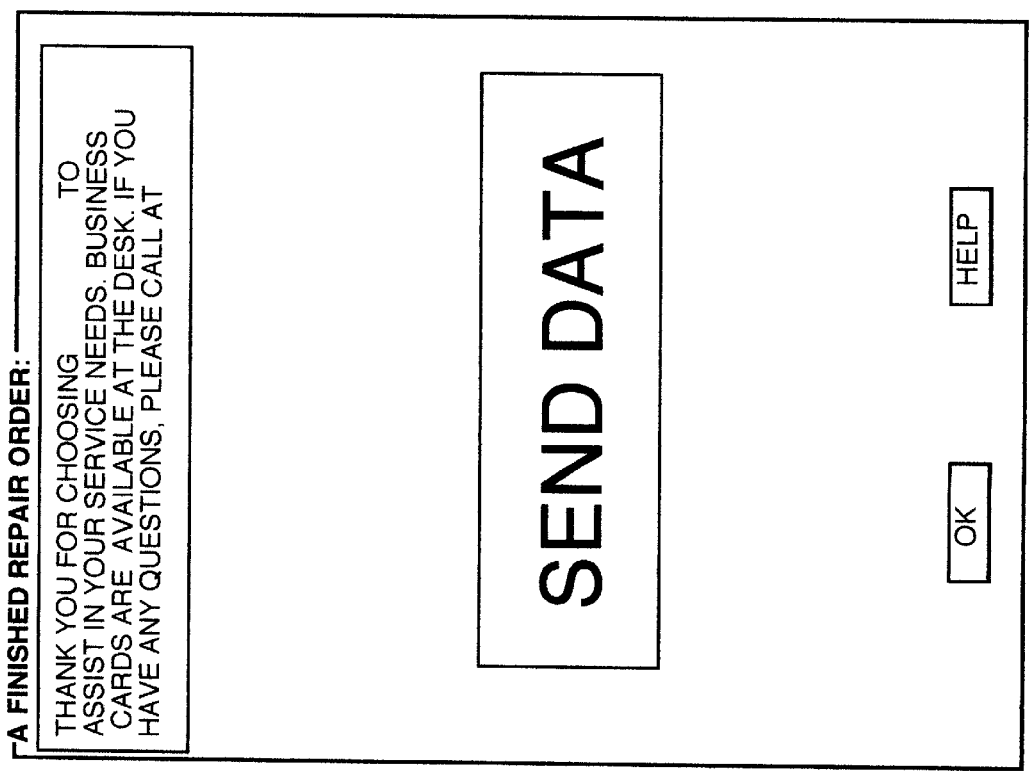

FIGS. 31A and 31B illustrate "Repair order acceptance" screens. This corresponds to block 180 of FIG. 2.

FIG. 32 illustrates the "Repair order generated" screen including the captured customer signature.

Figure 33:
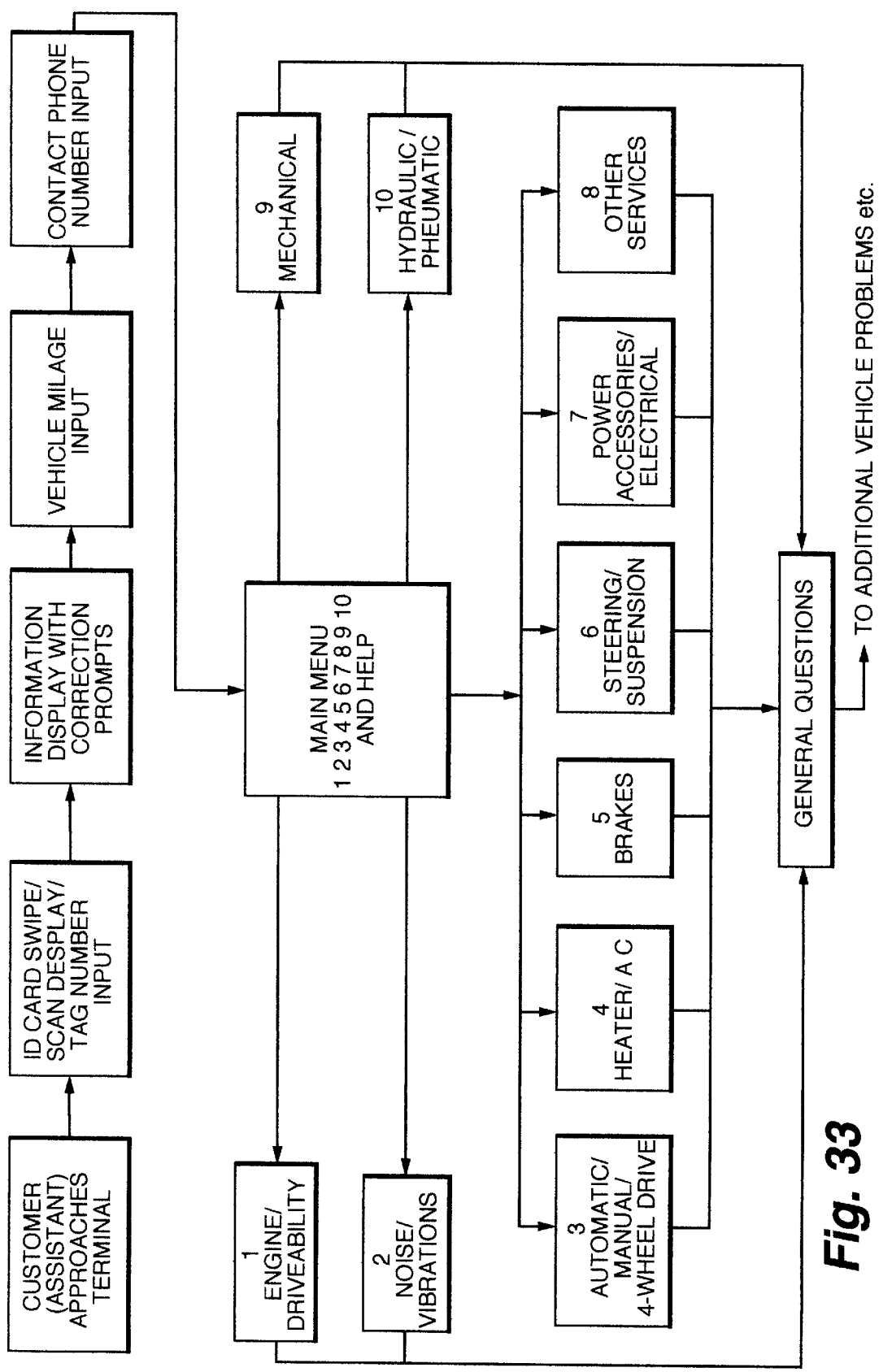
FIG. 33 is a portion of a typical flowsheet for the repair of other vehicles and equipment.

FIG. 33 illustrates the additional categories 9 and 10 of a Master Flow Sheet extending FIG. 2 for various types of vehicular equipment.

GENERAL DESCRIPTION OF THE INVENTION

Various combinations of commercially available computer hardware can be used to assemble the systems of the invention. Computer support can range from a single personal computer or microcomputer to a master computer with multiple terminals. Portable or hand-held terminals or computers can be used to facilitate the collection and transmission of data. The computer support mechanisms preferably include a central processing unit, at least one compiler, data storage devices including disk drives and the like, at least one monitor with display screen, a modem, an interactive media device and input/output mechanisms. The computer system is configured, as required, by the particular programs to be run with capacities and rates suitable to provide reasonable response times.

Input mechanisms can include conventional keyboards and/or keypads, interactive touch screens, and screens with icons, such as graphical user interfaces, that are responsive to input devices, such as a "mouse", optical and magnetic readers, and data input ports. Preferably the input mechanisms include touch-active display screens as discussed in detail below. Such screens in permit interaction between a user and the computer in response to the user's touching the screen with an object such as a finger or a pointing device. As disclosed in U.S. Pat. No. 5,537,315, such pointing devices can include a light pen, sonic pen, voltage pencil, stick, or wand. Other input mechanisms to the system, if not directly to the computer, will include smart card devices, such as conventional credit card readers, is for receiving data about the customer and/or vehicle to be serviced, plus payment information such as credit card numbers. One suitable credit card reader is disclosed in U.S. Pat. No. 4,449,186, column 1. Optionally, the input mechanisms can include a voice-activated system, such as a digitized voice recognition system for receiving user input, such as those pioneered by Dragon Systems, Inc., San Rafael, Calif.

The computer support mechanisms preferably include at least one hand-held or portable terminal which permits data to be input to the system vial a keypad or keyboard or equivalent device. This will permit a service advisor and/or mechanic to receive and input data conveniently from the vehicle. Such terminals have become commonly available and can be designed or purchased and modified to interface with the system. A representative example of such terminals is found in U.S. Pat. No. 5,468,575.

Since most contemporary automotive vehicles include onboard computers which receive information from sensors, control various systems via actuators, and record various failures of equipment, input mechanisms for the system should include mechanisms for reading and analyzing data from such onboard computers. Any suitable mechanism can be used which allows such data to be read, analyzed, and input to the computer of the system. One example is the "hand-held automotive diagnostic service tool", of U.S. Pat. No. 5,541,840, which is incorporated herein by reference. As disclosed in U.S. Pat. No. 4,602,127, many modern vehicles include mechanisms for obtaining direct access to the data of such onboard computers on a real-time basis. Inputs to the system can also be provided by automatic vehicle recognition and diagnostic systems such as those disclosed in U.S. Pat. No. 5,557,268.

Output mechanisms can include display mechanisms, such as the CRT display screens of computer monitors, printers, and program-actuated facsimile, credit checking devices, and/or telephone devices. The printer(s) can be any suitable unit(s) selected from commercially available models such as laser or ink jet printers.

Computer programs or software subsystems or modules are used to carry out various tasks for which the systems are employed. Many of these subsystems can be obtained or modified from existing commercial programs. In any case, the required programs can readily be provided by those of ordinary skill in the art in view of the teachings herein. For instance, accounting and billing programs are readily available and can be obtained or modified to provide a statement of account for services performed. Programs for receiving and analyzing the data stored in vehicle onboard computers are also available. However, the most important part of the diagnostic process will still generally be the analysis by the mechanic and/or service to manager of the information provided by such programs and the vehicle driver. Service order-writing programs are generally available; see, e.g., U.S. Pat. No. 5,058,044.

Programs to generate and/or access a service record for the vehicle(s) serviced are also available. Technical library or database programs can be used to provide access to scheduled and unscheduled maintenance operations, service and parts manuals for the mechanic as well as the customer. Programs for identifying and ordering parts are also available. However, such programs will generally be tailored or prepared especially for users of the particular systems of the invention.

The figures provide an exemplary mechanism for obtaining the vehicle driver's input. They do not include a listing of all possible options with respect to automobiles. The additional categories 9 for "Mechanical" and 10 for "Hydraulic or Pneumatic" systems will include the "What", "Where", and "When" questions of the previous categories and will provide feedback subroutines necessary to handle vehicles other than automobiles and mechanical equipment for grading, lifting, moving, etc., various items and/or products.

Now, having described our invention, what we claim is:

1. A lay person interactive symptomatic recording device for standardizing and compiling symptoms of a product sensed by the lay person and generating a comprehensive standardized chart of symptoms for a service provider, the recording device comprising:
   a query generator;
   a presentation device that receives and presents an initial query generated by the query generator to the lay person, the presentation device also receives and presents at least one next query generated by the query generator;
   an input device allowing the lay person to respond to the queries presented on the presentation device;
   a compiler coupled to the input device to compile the received responses; and
   an output device coupled to the compiler to prepare a standardized chart of the symptoms of a product based on the compiled responses for use by a service provider, the standardized chart providing sufficient information so the lay person does not need to have direct communication with the service provider when leaving the product with the service provider;
   wherein the query generator is coupled to the presentation device to generate the initial query and send the initial query to the presentation device, the query generator is coupled to the input device to receive responses to the queries from the input device and generate at least one next query based on the received response, and at least one of the next queries is related to a symptom sensed by the lay person.

2. The recording device according to claim 1 wherein the product is one of the group consisting of a mechanical device, an electrical device, an electro-mechanical device, an optical device, an automotive device, and an animal.

3. The recording device according to claim 1 wherein the product is a human animal and the symptoms relate to medical conditions.

4. The recording device according to claim 1 wherein the presentation device is visual.

5. The recording device according to claim 4 wherein the presentation device is a hand held computing device having a visual display.

6. The recording device according to claim 4 wherein the presentation device is a personal computer.

7. The recording device according to claim 1 wherein the input device is a touch activated screen.

8. The recording device according to claim 1 wherein the input device is a keyboard.

9. The recording device according to claim 8 wherein the keyboard is an alpha-numeric keyboard.

10. The recording device according to claim 8 wherein the keyboard is a numeric keyboard.

11. The recording device according to claim 1 wherein the input device is a scanning device.

12. The recording device according to claim 11 wherein the scanning device is an electro-optical scanning device.

13. The recording device according to claim 11 wherein the scanning device is an optical scanning device.

14. The recording device according to claim 11 wherein the scanning device is an electrical scanning device.

15. The recording device according to claim 11 wherein the scanning device is a radio-frequency scanning device.

16. The recording device according to claim 11 wherein the scanning device is a magnetic scanning device.

17. The recording device according to claim 11 wherein the scanning device is an electro-magnetic scanning device.

18. The recording device according to claim 1 wherein the query generator generates menu based queries that categorize symptoms of the product based on symptoms the lay person would sense through at least one of the five senses.

19. The recording device according to claim 18 wherein the query generator categorizes symptoms based on when the symptom occurs.

20. The recording device according to claim 18 wherein the query generator categorizes symptoms based on where the symptom occurs.

21. The recording device according to claim 18 wherein the query generator categorizes symptoms based on how often the symptom occurs.

22. The recording device according to claim 18 wherein the query generator categorizes symptoms based on when, where, and how often the symptoms occur.

23. The recording device according to claim 1 wherein the query generator generates at least one pictorial representation of the product for presentation on the input device.

24. The recording device according to claim 23 wherein the input device allows the lay person to respond to at least one query by touching the at least one pictorial representation of the product.

25. The recording device according to claim 1 wherein the output device is a printer.

26. The recording device according to claim 1 wherein the output device is a monitor.

27. The recording device according to claim 1 wherein a printer is integrated into the input device, the printer outputs instructions to the lay person regarding depositing the product for the service provider and outputs instructions to the lay person regarding claiming the product.

28. The recording device according to claim 1 further comprising a storage device for storing information regarding the lay person and the product.

29. The recording device according to claim 1 wherein internet connections are used to couple devices.

30. A method of allowing a lay person to record symptomatic problems to generate a comprehensive standardized chart of symptoms for a service provider; the method comprising the steps of:

initially querying a lay person for information;

receiving responses from the lay person related to the initial query;

generating at least one next query based on the received response, at least one of the next queries relate to categories of symptoms sensed using at least one of the five human senses by the lay person for the product;

receiving next responses from the lay person to the at least one next query;

determining whether additional symptomatic information is necessary;

repeating the generating at least one next query, receiving next responses, and determining whether additional symptomatic information is necessary based on the determination;

compiling the symptomatic information received from the lay person; and outputting a standardized chart of the symptoms of the product based on the compiled information for use by a service provider, the outputted standardized chart having sufficient information so the lay person does not need to have direct communication with the service provider when leaving the product with the service provider.

31. The method according to claim 30 wherein the generating at least one next query step includes generating menu based queries that categorize symptoms of the product based on what symptoms of the lay person would sense using the five human senses.

32. The method according to claim 30 wherein the generating at least one next query step includes generating at least one pictorial representation of the product.

33. The method according to claim 32 wherein the receiving next response step includes receiving the next response based on the lay person touching the at least one pictorial representation of the product.

34. The method according to claim 30 further comprising the step of:

providing the standardized chart of the symptoms to the lay person; and instructing the lay person how to deposit the product for the service provider and claiming the product.

35. The method according to claim 34 further comprising the step of:

capturing a signature of the lay person that provides authorization to the service provider.

36. A computer program product comprising:

a computer usable medium having computer readable code embodied therein for processing data, the computer usable medium comprising:

a querying module configured to generate an initial query to a lay person for information;

a receiving module configured to receive a response from the lay person to the initial or next query;

the querying module further configured to generate at least one next query based on the received response regarding symptoms of a product;

a compiling module configured to compile the received responses including the symptomatic information; and an outputting module configured to output a standardized chart of the symptoms of the product based on the compiled information for use by a service provider, the outputted standardized chart having sufficient information so the lay person does not need to have direct communication with the service provider when leaving the product with thee service provider.

37. The computer program product according to claim 36 wherein the querying module is further configured to generate menu based queries that categorize symptoms of the product based on what symptoms the lay person would sense using at least one of the five senses.

38. The computer program product according to claim 36 further comprising:

a graphics module configured to generate at least one pictorial representation of the product.

39. The computer program product according to claim 36 further comprising:

an internet module configured to establish internet connections.

* * * * *